United States Patent
Li et al.

(10) Patent No.: US 11,800,470 B2
(45) Date of Patent: Oct. 24, 2023

(54) MEASUREMENT GAP PARAMETER CONFIGURATION METHOD, REFERENCE SIGNAL MEASUREMENT METHOD, AND DEVICE

(71) Applicant: Huawei Technologies Co., Ltd., Shenzhen (CN)

(72) Inventors: Bingzhao Li, Beijing (CN); Nathan Edward Tenny, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/784,769

(22) Filed: Feb. 7, 2020

(65) Prior Publication Data

US 2020/0178194 A1    Jun. 4, 2020

Related U.S. Application Data

(63) Continuation of application No. PCT/CN2018/100042, filed on Aug. 10, 2018.

(30) Foreign Application Priority Data

Aug. 10, 2017   (CN) .......................... 201710680864.6

(51) Int. Cl.
  *H04W 56/00*    (2009.01)
  *H04L 1/00*    (2006.01)
  (Continued)

(52) U.S. Cl.
  CPC ....... *H04W 56/0015* (2013.01); *H04L 1/0026* (2013.01); *H04L 5/0051* (2013.01); *H04W 24/10* (2013.01); *H04W 28/20* (2013.01)

(58) Field of Classification Search
  None
  See application file for complete search history.

(56) References Cited

U.S. PATENT DOCUMENTS

2012/0178465 A1    7/2012   Lin et al.
2013/0267246 A1    10/2013   Wang et al.
(Continued)

FOREIGN PATENT DOCUMENTS

CN    101784075 A    7/2010
CN    102595450 A    7/2012
(Continued)

OTHER PUBLICATIONS

Samsung, "Discussion on intra-frequency,inter-frequency, and inter-RAT measurement", 3GPP TSG-RAN WG4 NR AH#2; R4-1706652, Jun. 27-29, 2017, XP051308424, 3 pages.
(Continued)

*Primary Examiner* — Scott M Sciacca
(74) *Attorney, Agent, or Firm* — Slater Matsil, LLP

(57) ABSTRACT

A measurement gap parameter configuration method, a reference signal measurement method, and a device are disclosed. The measurement gap configuration method includes: determining, by a network device, that a first condition is satisfied; and configuring, by the network device, one or more measurement gap parameters for a terminal device, where the measurement gap parameter is used by the terminal device to measure a to-be-measured reference signal.

16 Claims, 9 Drawing Sheets

(51) Int. Cl.
*H04L 5/00* (2006.01)
*H04B 17/309* (2015.01)
*H04W 24/10* (2009.01)
*H04W 28/20* (2009.01)

(56) References Cited

U.S. PATENT DOCUMENTS

| | | | |
|---|---|---|---|
| 2016/0219453 A1 | 7/2016 | Harada et al. | |
| 2016/0337056 A1* | 11/2016 | Frenne | H04B 7/0413 |
| 2016/0337893 A1 | 11/2016 | Gheorghiu et al. | |
| 2016/0337916 A1* | 11/2016 | Deenoo | H04W 36/0088 |
| 2017/0223558 A1 | 8/2017 | Deng et al. | |
| 2017/0257785 A1 | 9/2017 | Henttonen et al. | |
| 2017/0339714 A1* | 11/2017 | Harada | H04L 5/0091 |
| 2018/0091212 A1* | 3/2018 | Lee | H04B 7/086 |
| 2018/0368035 A1* | 12/2018 | Huang | H04W 36/0094 |
| 2019/0363809 A1* | 11/2019 | Yoon | H04W 56/00 |
| 2020/0022040 A1* | 1/2020 | Chen | H04W 36/0085 |
| 2020/0120622 A1* | 4/2020 | Yoon | H04W 24/10 |
| 2020/0154296 A1* | 5/2020 | Siomina | H04W 24/10 |

FOREIGN PATENT DOCUMENTS

| | | |
|---|---|---|
| CN | 102714816 A | 10/2012 |
| CN | 104937992 A | 9/2015 |
| CN | 105228198 A | 1/2016 |
| CN | 106664539 A | 5/2017 |
| EP | 2512044 A1 | 10/2012 |
| EP | 2953392 A1 | 12/2015 |
| EP | 3471296 A1 | 4/2019 |
| WO | 2012112112 A1 | 8/2012 |
| WO | 2015094701 A1 | 6/2015 |
| WO | 2015133823 A1 | 9/2015 |
| WO | 2018062959 A1 | 4/2018 |

OTHER PUBLICATIONS

3GPP TS 38.331 V0.0.4 (Jun. 2017), 3rd Generation Partnership Project; Technical Specification Group Radio Access Network; NR; Radio Resource Control (RRC); Protocol specification (Release 15), 22 pages.
NTT Docomo, Inc., "Dual Connectivity for LTE," 3GPP TSG RAN meeting #66, RP-141796, Maui, USA, Dec. 8-11, 2014, 31 pages.
Bei, C. et al., "Performance Evaluation of LTE Advanced Downlink Channel Estimators," Application of Electronic Technique, vol. 39, No. 8, 2013, 4 pages.
Li H. et al., "CSI-RS-based CQI Measurement," Guangdong Communication Technology, Nov. 2016, 5 pages (with English Abstract).

* cited by examiner

MEASUREMENT GAP PARAMETER CONFIGURATION METHOD, REFERENCE SIGNAL MEASUREMENT METHOD, AND DEVICE

CROSS-REFERENCE TO RELATED APPLICATIONS

This application is a continuation of International Application No. PCT/CN2018/100042, filed on Aug. 10, 2018, which claims priority to Chinese Patent Application No. 201710680864.6, filed on Aug. 10, 2017. The disclosures of the aforementioned applications are hereby incorporated by reference in their entireties.

TECHNICAL FIELD

This application relates to the field of communications technologies, and in particular, to a measurement gap parameter configuration method, a reference signal measurement method, and a device.

BACKGROUND

Currently, a measurement gap (GAP) may be configured for a terminal device, so that the terminal device measures a reference signal whose frequency is beyond an operating band range of a serving cell of the terminal device. However, currently, all gaps are fixedly configured. A base station even configures gaps for terminal devices that do not need to measure reference signals whose frequencies are beyond operating band ranges of serving cells of the terminal devices. However, such terminal devices do not need to use the gaps. In this way, a waste of resources is caused. In addition, if such terminal devices use the gaps, normal operation of the terminal devices is affected.

SUMMARY

Embodiments of this application provide a measurement gap parameter configuration method, a reference signal measurement method, and a device, to reduce a waste of resources and ensure normal operation of a terminal device.

In the embodiments of this application, an initial moment of a measurement gap may refer to a specific initial time point, or may be a frame or a subframe in which an initial time point of the measurement gap is located. An end moment of the measurement gap may refer to a specific initial time point, or may be a frame or a subframe in which an end time point of the measurement gap is located. A stop moment of the measurement gap may refer to a specific initial time point, or may be a frame or a subframe in which a stop time point of the measurement gap is located. A start moment of the measurement gap may refer to a specific initial time point, or may be a frame or a subframe in which a start time point of the measurement gap is located.

According to a first aspect, a measurement gap parameter configuration method is provided. The method may be performed by a network device. The network device is, for example, a base station. The method includes: determining, by a network device, that a first condition is satisfied; and configuring, by the network device, one or more measurement gap parameters for a terminal device, where the measurement gap parameter is used by the terminal device to measure a to-be-measured reference signal. The first condition includes at least one of the following: a frequency band of the to-be-measured reference signal is not within a range of an operating band of a serving cell of the terminal device; a center frequency of the to-be-measured reference signal is different from a center frequency of the serving cell of the terminal device; the center frequency of the to-be-measured reference signal is different from center frequencies of all synchronization signals of the serving cell of the terminal device; a bandwidth of the to-be-measured reference signal is different from bandwidths of all the synchronization signals of the serving cell of the terminal device; the center frequency of the to-be-measured reference signal is different from a center frequency of an active bandwidth part of the terminal device, and the bandwidth of the to-be-measured reference signal is different from a bandwidth of the active bandwidth part of the terminal device; the center frequency of the to-be-measured reference signal is different from a center frequency of a bandwidth part configured for the terminal device; the bandwidth of the to-be-measured reference signal is different from a bandwidth of the bandwidth part configured for the terminal device; and the terminal device does not support simultaneous reception of two types of beams.

In this embodiment of this application, the network device configures the one or more measurement gap parameters for the terminal device when determining that a condition for configuring the one or more measurement gap parameters for the terminal device is satisfied, so that the one or more configured measurement gap parameters are relatively compliant with an actual requirement of the terminal device, thereby avoiding a waste of measurement gap resources. In addition, the terminal device can measure a reference signal during a measurement gap, and the terminal device can work in an operating band beyond the measurement gap, thereby ensuring normal operation of the terminal device as much as possible.

In a possible design, the measurement gap parameters include a first measurement gap parameter and a second measurement gap parameter, the first measurement gap parameter is used by the terminal device to measure a synchronization signal, and the second measurement gap parameter is used by the terminal device to measure a channel state information-reference signal; or the measurement gap parameter includes a third measurement gap parameter, and the third measurement gap parameter is used by the terminal device to measure a synchronization signal and/or a channel state information-reference signal.

By configuring two measurement gap parameters for the terminal device, the terminal device can measure different reference signals in different measurement gaps. A terminal device that cannot receive two different types of beams simultaneously can measure different reference signals by using the solution provided in this embodiment of this application. In addition, a time for sending a synchronization signal SS by the network device may be different from a time for sending a channel state information-reference signal CSI-RS by the network device. If only one measurement gap parameter is configured, a length of a measurement gap corresponding to the measurement gap parameter may be excessively long. Therefore, in this embodiment of this application, two measurement gap parameters may be configured, so that a length of a measurement gap corresponding to each measurement gap parameter is not excessively long. This does not excessively affect normal operation of the terminal device on the operating band of the serving cell of the terminal device. Alternatively, one measurement gap parameter may be configured for the terminal device, so that the terminal device can measure a reference signal in the one measurement gap. The terminal device that cannot receive two different types of beams simultaneously can measure one of reference signals in one measurement gap, and the network device may not send another reference signal to the terminal device within the measurement gap, so that a case in which the terminal device needs to receive two types of beams simultaneously can be avoided, thereby satisfying a capability requirement of the terminal device.

According to a second aspect, a reference signal measurement method is provided. The method may be performed by a terminal device. The method includes: determining, by a terminal device, time information of a first measurement gap based on a first measurement gap parameter; obtaining, by the terminal device in the time information of the first measurement gap, time information of a cell in which a channel state information-reference signal is located; determining, by the terminal device, time information of a second measurement gap based on a second measurement gap parameter; and measuring, by the terminal device in the time information of the second measurement gap, the channel state information-reference signal based on the time information of the cell and configuration information of the channel state information-reference signal, where the configuration information of the channel state information-reference signal is used to indicate time information of the channel state information-reference signal.

The network device configures two measurement gap parameters for the terminal device, so that the terminal device can measure different reference signals in different measurement gaps, and the terminal device can obtain, in the first measurement gap, the time information of the cell in which the channel state information-reference signal is located, to measure a channel state information-reference signal in the second measurement gap, and a case in which the channel state information-reference signal cannot be measured because the time information of the cell in which the channel state information-reference signal is located cannot be obtained is avoided as much as possible, thereby improving signal measurement reliability.

In a possible design, the first measurement gap parameter includes a period of a first measurement gap and an offset of a first measurement gap, and the period of the first measurement gap and the offset of a first measurement gap are used to determine the time information of a first measurement gap; and the second measurement gap parameter includes a period of a second measurement gap and an offset of a second measurement gap, and the period of a second measurement gap and the offset of a second measurement gap are used to determine the time information of a second measurement gap.

Parameter information that may be included in the measurement gap parameters is described. The time information of the measurement gaps can be determined by using the parameter information included in the measurement gap parameters, so that the terminal device can measure reference signals in the measurement gaps indicated by the measurement gap parameters.

In a possible design, the period of the first measurement gap is different from the period of the second measurement gap, and the offset of the first measurement gap is the same as or different from the offset of the second measurement gap; or the period of the first measurement gap is the same as the period of the second measurement gap, and the offset of the first measurement gap is different from the offset of the second measurement gap.

That is, the first measurement gap and the second measurement gap are different measurement gaps.

In a possible design, the third measurement gap parameter includes a period of a third measurement gap and a cycle quantity of time information of a third measurement gap, and the period of a third measurement gap and the cycle quantity of the time information of a third measurement gap are used to determine the time information of the third measurement gap.

A reason why the cycle quantity exists is that the third measurement gap may have different positions in different periods. If a plurality of periods are regarded as a whole, it may be considered that the third measurement gap is cycled. For the terminal device, the terminal device may need to measure reference signals sent by a plurality of cells, and positions of reference signals sent by different cells may be different. If a position of a measurement gap in each period is fixed, the terminal device measures a reference signal at a fixed position in each period, and positions of reference signals sent by some cells are always beyond the fixed measurement gap, so that the terminal device may always fail to measure the reference signals. After the technical solution provided in this embodiment of this application is used, the third measurement gap can move in different periods, so that the terminal device can measure reference signals at different positions in different periods, and the terminal device can measure, as much as possible, reference signals sent by cells. This helps to expand a measurement range of the terminal device.

In a possible design, after the configuring, by the network device, one or more measurement gap parameters for a terminal device, the network device may further send the one or more measurement gap parameters to the terminal device.

In other words, the network device sends the one or more measurement gap parameters to the terminal device, so that the terminal device can measure a reference signal in a measurement gap indicated by the measurement gap parameter.

In a possible design, the first measurement gap parameter further includes stop time information of the first measurement gap, and in this case, the terminal device may further determine a stop moment of the first measurement gap based on the stop time information of the first measurement gap.

The measurement gap periodically occurs, and a stop indicates that the measurement gap is not started any more after the stop moment. The first measurement gap is used to measure a synchronization signal. The terminal device may not need to measure the synchronization signal for a plurality of times, and needs to perform the measurement only once or several times to obtain the time information of a cell in which the terminal device is located. Therefore, the first measurement gap used to measure the synchronization signal does not need to always exist. The first measurement gap parameter may include the stop time information of the first measurement gap. After a stop moment indicated by the stop time information, the first measurement gap may not need to be started again, and a time originally occupied by the first measurement gap may be used to complete other work, thereby improving time resource utilization.

In a possible design, the stop time information of the first measurement gap includes an occurrence quantity of the first measurement gap or the stop moment of the first measurement gap.

If the stop time information of the first measurement gap includes the occurrence quantity of the first measurement gap, the network device may pre-estimate a probable quantity of first measurement gaps by using which the terminal device can measure a synchronization signal. For example, if the network device pre-estimates that the terminal device can measure a synchronization signal by using two first measurement gaps, the occurrence quantity of the first measurement gap included in the stop time information of the first measurement gap may be 2, or may be 3 or a larger value for higher reliability. For example, if the occurrence quantity of the first measurement gap included in the stop time information of the first measurement gap is 2, the first measurement gap is not started any more after the first measurement gap occurs twice. If the stop time information of the first measurement gap includes the stop moment of the first measurement gap, the network device may also pre-estimate a probable time within which the terminal device can measure a synchronization signal by using the first measurement gap. For example, if the network device pre-estimates that the terminal device can measure a synchronization signal within 10 s by using the first measurement gap, the stop moment of the first measurement gap included in the stop time information of the first measurement gap may be a 10th second, or may be an 11th second or another larger value for higher reliability. For example, if the stop moment of the first measurement gap included in the stop time information of the first measurement gap is the 10th second, the first measurement gap is not started any more after the first measurement gap is started for 10 s for the first time. Regardless of a manner in which the stop time information of the first measurement gap is implemented, a manner in which the stop time information of the first measurement gap indicates the stop moment of the first measurement gap is relatively simple and easy to implement.

In a possible design, after the first measurement gap stops, the terminal device starts the second measurement gap.

The first measurement gap is used to measure a synchronization signal. Therefore, after the first measurement gap stops, it may be considered that the terminal device has measured the synchronization signal, in other words, the terminal device has obtained time information of a cell, and may subsequently measure another reference signal such as a channel state information-reference signal. Therefore, after the first measurement gap stops, the terminal device may start the second measurement gap, to measure the channel state information-reference signal in time. The terminal device starts the second measurement gap at an initial position of a first second measurement gap after the first measurement gap stops.

In a possible design, the second measurement gap parameter further includes start time information of the second measurement gap, and the terminal device may further determine a start moment of the second measurement gap based on the start time information of the second measurement gap.

The network device may pre-estimate a probable time needed by the terminal device to measure an SS, to determine a start time of the second measurement gap based on an estimated result. That is, the network device may directly configure the start time information of the second measurement gap. The terminal device only needs to start the second measurement gap based on the start time information of the second measurement gap, and the terminal device does not need to perform determining based on other information. Therefore, the implementation is relatively simple for the terminal device.

In a possible design, the terminal device may further receive the second measurement gap parameter sent by the network device, and in this case, the terminal device starts the second measurement gap.

The network device sends the second measurement gap parameter to the terminal device, and in this case, the terminal device may start the second measurement gap after receiving the second measurement gap parameter. The terminal device may start the second measurement gap at an initial position of a first second measurement gap after receiving the second measurement gap parameter. In this manner, the terminal device may start the second measurement gap after receiving the second measurement gap parameter, and does not need to perform excessive work for determining a start occasion. This manner is relatively simple and direct.

In a possible design of this embodiment of this application, if a first condition is satisfied, the network device configures a measurement gap parameter for the terminal device, so that the terminal device can measure a reference signal in a measurement gap indicated by the measurement gap parameter. If there are a plurality of to-be-measured reference signals, the network device may choose to configure a plurality of measurement gap parameters for the terminal device. In an example in which to-be-measured reference signals include an SS and a CSI-RS, time for sending the SS and time for sending the CSI-RS by the network device may be different. If only one measurement gap parameter is configured, a length of a measurement gap corresponding to the measurement gap parameter may be excessively long. Therefore, in this embodiment of this application, the first measurement gap parameter and the second measurement gap parameter may be configured, and a length of a measurement gap corresponding to each measurement gap parameter is not excessively long. This does not excessively affect normal operation of the terminal device on an operating band of a serving cell of the terminal device.

The first measurement gap indicated by the first measurement gap parameter is used to measure an SS, and the second measurement gap indicated by the second measurement gap parameter is used to measure a CSI-RS, so that different reference signals can be measured by using different measurement gaps, thereby ensuring that all reference signals can be measured as much as possible without interfering with each other.

The network device sends the configured first measurement gap parameter and the configured second measurement gap parameter to the terminal device, so that the terminal device may perform measurement based on the first measurement gap parameter and the second measurement gap parameter.

The first measurement gap parameter includes the period of the first measurement gap and the offset of the first measurement gap, and the second measurement gap parameter includes the period of the second measurement gap and the offset of the second measurement gap. In this case, the terminal device may determine, based on the period of the first measurement gap and the offset of the first measurement gap, a position of the first measurement gap, that is, the time information of the first measurement gap. Similarly, the terminal device may determine the time information of the second measurement gap based on the period of the second measurement gap and the offset of the second measurement gap.

Because the first measurement gap parameter is used to measure an SS and the terminal device needs to first measure the SS to obtain time information of a cell even if the terminal device needs to measure another reference signal such as a CSI-RS, the terminal device first measures the SS in the first measurement gap. After completing measurement of the SS, the terminal device may obtain time information of a cell in which the CSI-RS is located, so that the terminal device may measure the CSI-RS in the second measurement gap, to complete measurement of the to-be-measured reference signals.

The first measurement gap may be started after the terminal device receives the first measurement gap parameter, so that the terminal device can measure the SS in time. The terminal device may determine the start time of the second measurement gap in different manners: for example, the terminal device may determine the start time of the second measurement gap based on the stop time information of the first measurement gap. In other words, after the first measurement gap stops, it is considered that the terminal device has measured the SS, and the terminal device may start the second measurement gap after the first measurement gap stops. Alternatively, the terminal device may determine the start time of the second measurement gap based on the start time information of the second measurement gap. In this manner, the network device may pre-estimate a probable time needed by the terminal device to measure the SS, to determine the start time of the second measurement gap based on an estimated result and enable the second measurement gap to be started at a proper time as far as possible. Alternatively, the terminal device may determine the start time of the second measurement gap based on a time of receiving the second measurement gap parameter, in other words, the network device sends the second measurement gap parameter to the terminal device, and the terminal device may start the second measurement gap after receiving the second measurement gap parameter. This manner is relatively simple.

In another aspect, for the terminal device, the terminal device may need to measure reference signals sent by a plurality of cells, and positions of reference signals sent by different cells may be different. If a position of the measurement gap in each period is fixed, the terminal device measures a reference signal at a fixed position in each period, and positions of reference signals sent by some cells are always beyond the fixed measurement gap, so that the terminal device may always fail to measure the reference signals. Therefore, in this embodiment of this application, the network device may also configure a measurement gap parameter which is the third measurement gap parameter, for the terminal device. The third measurement gap can move in different periods, that is, positions of the third measurement gap parameter are different in different periods, so that the terminal device can measure reference signals at different positions in different periods, and the terminal device can measure, as much as possible, reference signals sent by cells, thereby helping to expand a measurement range of the terminal device.

Specifically, the third measurement gap parameter may include a period of a third measurement gap and a cycle quantity of time information of a third measurement gap. The period of the third measurement gap and the cycle quantity of the time information of the third measurement gap are used to determine the time information of the third measurement gap. The network device may send the configured third measurement gap parameter to the terminal device, so that the terminal device may perform measurement by using the third measurement gap parameter. If a plurality of periods of the third measurement gap are regarded as a whole, it may be considered that the third measurement gap is cycled. For example, in a first period of the third measurement gap, the third measurement gap is located at a first position, and in a second period of the third measurement gap, the third measurement gap is located at a second position, where the first position is different from the second position, and so on. Certainly, because a length of a period of the third measurement gap is limited, after the third measurement gap cycles for a certain quantity of periods, the third measurement gap may be located at the first position again in an nth period of the third measurement gap and starts to cycle again. The position herein mainly refers to a time domain position. When two positions are different, it may be understood as that the positions are not overlapped, and the two positions may have an intersection or may have no intersection. In this manner, the third measurement gap covers the whole period of the third measurement gap as much as possible, so that the terminal device can measure reference signals at different positions in different periods, thereby avoiding missing reference signals as much as possible.

According to a third aspect, a network device is provided. The network device has functions for implementing the network device in the foregoing method designs. The functions may be implemented by hardware, or may be implemented by hardware executing corresponding software. The hardware or the software includes one or more units corresponding to the foregoing functions.

In a possible design, a specific structure of the network device may include a processor. Optionally, the network device may further include a transmitter. The processor and the transceiver may perform corresponding functions in the method according to any one of the first aspect or the possible designs of the first aspect.

According to a fourth aspect, a device is provided. The device may be the terminal device in the foregoing method designs, or may be a chip disposed in the terminal device in the foregoing method designs. The device has functions for implementing the terminal device in the foregoing method designs. The functions may be implemented by hardware, or may be implemented by hardware executing corresponding software. The hardware or the software includes one or more units corresponding to the foregoing functions.

In a possible design, a specific structure of the device may include a processor. The processor may perform corresponding functions in the method according to any one of the second aspect or the possible designs of the second aspect.

According to a fifth aspect, a network device is provided. The network device has functions for implementing the network device in the foregoing method designs. The functions may be implemented by hardware, or may be implemented by hardware executing corresponding software. The hardware or the software includes one or more units corresponding to the foregoing functions.

In a possible design, a specific structure of the network device may include a processing module. Optionally, the network device may further include a transceiver module, and the processing module and the transceiver module may perform corresponding functions in the method according to any one of the first aspect or the possible designs of the first aspect.

According to a sixth aspect, a device is provided. The device has functions for implementing the terminal device in the foregoing method designs. The functions may be implemented by hardware, or may be implemented by hardware executing corresponding software. The hardware or the software includes one or more units corresponding to the foregoing functions.

In a possible design, a specific structure of the device may include a processing module. The processing module may perform corresponding functions in the method according to any one of the second aspect or the possible designs of the second aspect.

According to a seventh aspect, a computer-readable storage medium is provided. The computer-readable storage medium stores an instruction, and when the instruction is run on a computer, the computer is enabled to perform the method in any one of the first aspect or the possible designs of the first aspect.

According to an eighth aspect, a computer-readable storage medium is provided. The computer-readable storage medium stores an instruction, and when the instruction is run on a computer, the computer is enabled to perform the method in any one of the second aspect or the possible designs of the second aspect.

According to a ninth aspect, a computer program product including an instruction is provided. The computer program product stores the instruction, and when the instruction is run on a computer, the computer is enabled to perform the method in any one of the first aspect or the possible designs of the first aspect.

According to a tenth aspect, a computer program product including an instruction is provided. The computer program product stores the instruction, and when the instruction is run on a computer, the computer is enabled to perform the method in any one of the second aspect or the possible designs of the second aspect.

In the embodiments of this application, the network device configures a measurement gap parameter for the terminal device when determining that a condition for configuring the measurement gap parameter for the terminal device is satisfied, so that the configured measurement gap parameter is relatively compliant with an actual requirement of the terminal device, thereby avoiding a waste of measurement gap resources.

DETAILED DESCRIPTION OF ILLUSTRATIVE EMBODIMENTS

Figure 1:
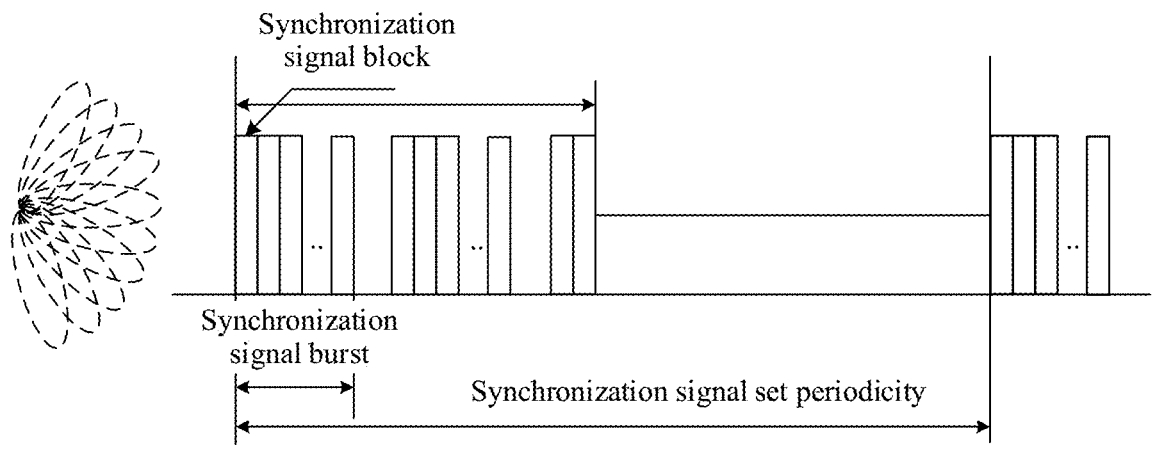
FIG. 1 is a schematic diagram of sending a synchronization signal by a network device.

To make the objectives, technical solutions and advantages of the embodiments of this application clearer, the following further describes the embodiments of this application in detail with reference to the accompanying drawings.

In the following, some terms of the embodiments of this application are described, to help a person skilled in the art have a better understanding.

(1) A terminal device includes a device that provides a user with voice and/or data connectivity, for example, may include a handheld device with a wireless connection function, or a processing device connected to a wireless modem. The terminal device may communicate with a core network through a radio access network (RAN), and exchange voice and/or data with the RAN. The terminal device includes user equipment (UE), a wireless terminal device, a mobile terminal device, a subscriber unit, a subscriber station, a mobile station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, computer built-in, or in-vehicle mobile apparatus, an intelligent wearable device, or the like. For example, it may be a device such as a personal communication service (PCS) phone, a cordless telephone set, a session initiation protocol (SIP) phone, a wireless local loop (WLL) station, a personal digital assistant (PDA), a smartwatch, a smart helmet, smart glasses, or a smart band. The terminal device further includes a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

(2) A network device includes, for example, a base station (for example, an access point), and may be a device that communicates with a wireless terminal device over an air interface by using one or more cells in an access network. The base station may be configured to mutually convert a received over-the-air frame and an Internet protocol (IP) packet and serve as a router between the terminal device and a rest portion of the access network, where the rest portion of the access network may include an IP network. The base station may coordinate attribute management of the air interface. For example, the base station may include an evolved base station (NodeB, or eNB, or e-NodeB, evolutional Node B) in a long term evolution (LTE) system or an evolved LTE system (LTE-Advanced, LTE-A), or may include a next generation node B (next generation node B, gNB) in a fifth-generation mobile communications system (5G) new radio (NR) system. This is not limited in the embodiments of this application.

(3) Measurement gap. In the LTE system, a measurement gap is used for configuration of a working interruption of a current frequency when the terminal device performs inter-frequency measurement. For a terminal device that does not support working at two frequencies, if the terminal device needs to perform measurement at a non-working frequency, the terminal device needs to interrupt a working frequency and then measure the non-working frequency within a time of the measurement gap. A length of the measurement gap in the LTE system is fixed to 6 ms, and a period of the measurement gap may be configured to be 40 ms, 80 ms, or the like. This means that the terminal device may interrupt a working frequency of a current cell every 40 ms or 80 ms, and switch to a target frequency to perform measurement by using a time of 6 ms.

Correspondingly, a measurement gap parameter in the embodiments of this application is used by the terminal device to interrupt work of a working frequency of a serving cell in a measurement gap indicated by the measurement gap parameter, to measure one of other frequencies except the working frequency of the serving cell. The serving cell is a serving cell of the terminal device, and includes the "current cell".

In an LTE system, a name of the measurement gap is a gap. In a next-generation communications system or another communications system, the measurement gap may have another name. The embodiments of this application do not limit a specific name of the measurement gap, as long as a usage of the measurement gap is the same as that in the embodiments of this application.

(4) Reference signal. In the embodiments of this application, a to-be-measured reference signal may include a synchronization signal (SS) and/or a channel state information-reference signal (CSI-RS), and certainly, may further include another reference signal.

The terminal device may perform work such as cell synchronization by measuring the SS. Referring to an example in FIG. 1, a synchronization signal may be sent in a synchronization signal set periodicity (SS set periodicity), one synchronization signal set periodicity includes a plurality of synchronization signal bursts (SS burst), and each synchronization signal burst includes a plurality of synchronization signal blocks (SS block). One SS block may be sent in each beam (beam) in one cell, and all SS blocks are sent in one SS set periodicity.

The CSI-RS is a cell-based reference signal, and may be used for measurement of information such as a channel quality indicator (CQI), a precoding matrix indicator (PMI), and a rank indication (RI).

Figure 2:
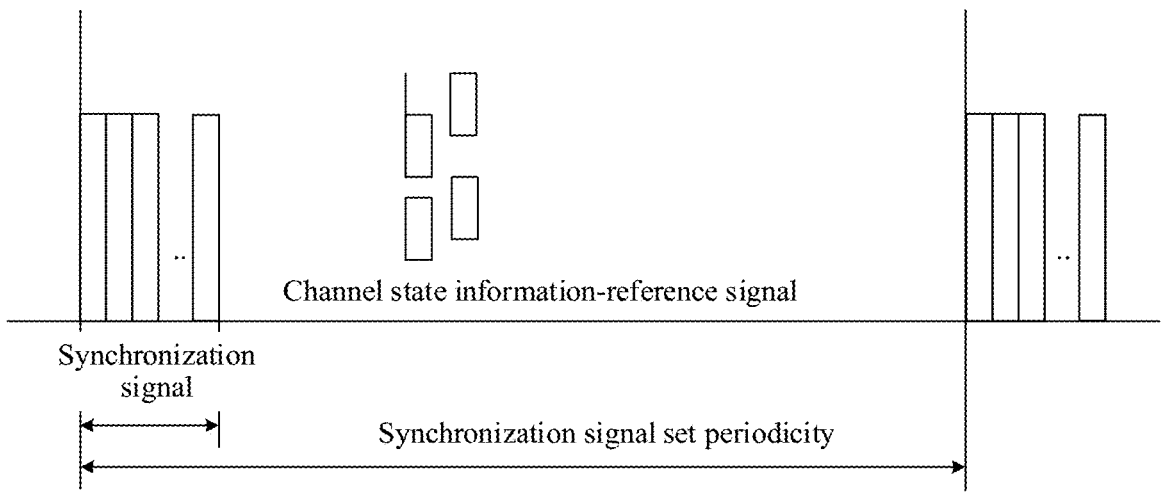
FIG. 2 is a schematic diagram of a relationship between measurement of an SS and measurement of a CSI-RS of a terminal device.

Both a terminal device in an idle state and a terminal device in a connected state may perform measurement based on an SS. In addition, the terminal device in the connected state may perform measurement based on an SS, and may also perform measurement based on a CSI-RS. However, before measuring the CSI-RS, the terminal device needs to first obtain synchronization of a cell by measuring the SS, that is, obtain time information of the cell. Otherwise, the terminal device cannot learn of an occurrence position of the CSI-RS, and cannot perform measurement. Referring to FIG. 2, the terminal device obtains time information of a cell by measuring an SS, to complete measurement of a CSI-RS that occurs later.

5) The terms "system" and "network" may be used interchangeably in the embodiments of this application. "A plurality of" refers to two or more. In view of this, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless otherwise specified.

Unless otherwise stated, in the embodiments of this application, ordinal numbers such as "first" and "second" are used to distinguish between a plurality of objects, and not intended to limit an order, a time sequence, a priority, or an importance of the plurality of objects.

The technical solutions provided in this specification may be applied to a 5G NR system (NR system for short below) or an LTE system, or may be applied to a next-generation mobile communications system or another similar mobile communications system.

The foregoing describes some concepts involved in the embodiments of this application, and the following describes an application scenario of the embodiments of this application.

Figure 3:
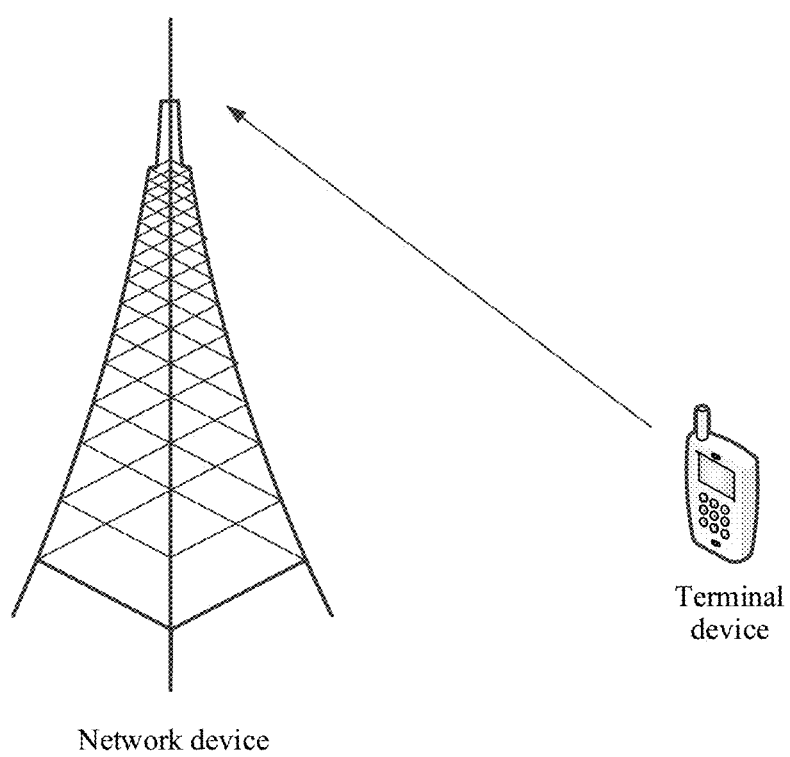
FIG. 3 is a schematic diagram of an application scenario of an embodiment of this application.

FIG. 3 is a schematic diagram of an application scenario of an embodiment of this application. FIG. 3 includes a network device and a terminal device. The network device may configure a measurement gap parameter for the terminal device, and the terminal device may perform inter-frequency measurement in a configured measurement gap. The network device in FIG. 3, for example, an access network (AN) device, communicates with the terminal device, receives data sent by the terminal device, and may send the received data to a core network device. The solution in this embodiment of this application mainly relates to the access network device and the terminal device. Therefore, the core network device is not shown in FIG. 3.

The access network device corresponds to different devices in different systems. For example, in a second generation mobile communications technology (2G) system, the access network device may correspond to a base station and a base station controller; in a third generation mobile communications technology (3G) system, the access network device may correspond to a base station and a radio network controller (radio network controller, RNC); in a fourth generation mobile communications technology (4G) system, the access network device may correspond to an eNB; and in a fifth generation mobile communications technology (5G) system, the access network device may correspond to an access network device in 5G. The access network device in 5G has no official name currently, for example, a gNB, a centric unit (CU), or a distributed unit (DU).

The following describes the technical solutions provided in the embodiments of this application with reference to the accompanying drawings.

Figure 4:
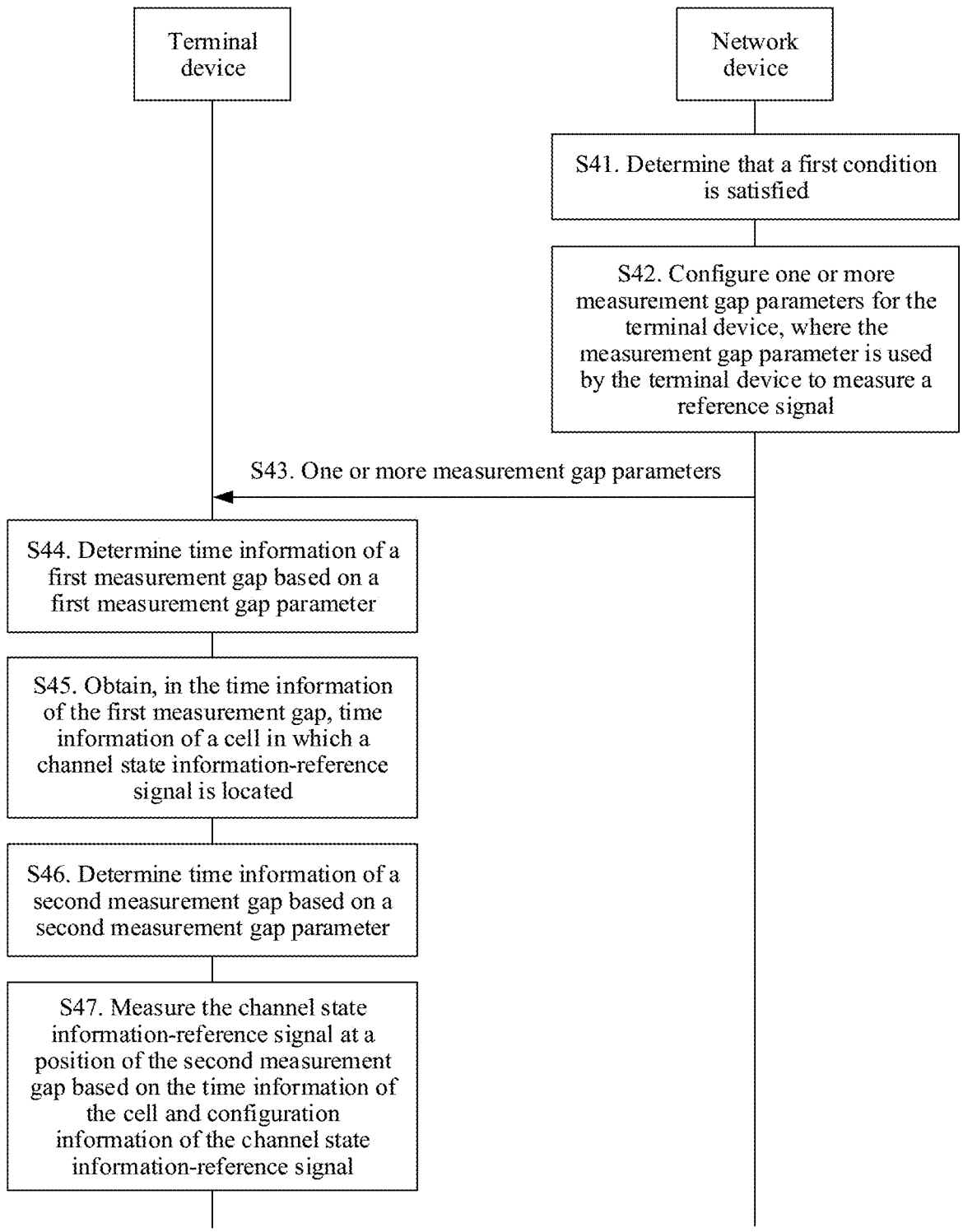
FIG. 4 is a flowchart of a measurement gap parameter configuration method and a reference signal measurement method according to an embodiment of this application.

Referring to FIG. 4, an embodiment of this application provides a measurement gap parameter configuration method and a reference signal measurement method. During all of the following description, an example in which the method provided in this embodiment of this application is applied to an application scenario shown in FIG. 3 is used.

S41. A network device determines that a first condition is satisfied. The first condition may be a condition for configuring one or more measurement gap parameters for a terminal device. It may be understood that when the first condition is satisfied, it is determined that the measurement gap parameters can be configured for the terminal device.

In this embodiment of this application, the network device determines, based on a frequency band of a to-be-measured reference signal included in a to-be-measured object or a beam type supported by the terminal device, whether a measurement gap needs to be configured for the terminal device. The to-be-measured object includes a to-be-measured frequency or a to-be-measured cell. The reference signal included in the to-be-measured object may be an SS or a CSI-RS. When the to-be-measured object includes a plurality of groups of reference signals (SSs or CSI-RSs), to-be-measured reference signals are any group of reference signals included in the to-be-measured object.

In addition, the to-be-measured reference signals may include a reference signal sent by the network device, and may further include a reference signal sent by another network device other than the network device. If the to-be-measured reference signals include the reference signal sent by the network device, the network device may determine information about the reference signal sent by the network device. If the to-be-measured reference signals include the reference signal sent by the another network device other than the network device, the another network device may exchange information with the network device, to notify the network device of information about the reference signal sent by the another network device. In this case, the network device can determine, based on the information about the to-be-measured reference signals, whether the first condition is satisfied, and subsequently, can further configure the one or more measurement gap parameters for the terminal device based on the information about the to-be-measured reference signals. The information about the to-be-measured reference signals includes, for example, at least one of time information, frequency-domain information, and a type of the to-be-measured reference signals. The type of the reference signals may also be understood as content of the reference signals. For example, the SS and the CSI-RS are reference signals of different types.

The first condition may include at least one of the following, that is, when at least one of the following conditions is satisfied, it is determined that the one or more measurement gap parameters can be configured for the terminal device:

(1) A frequency band of the to-be-measured reference signal is not within a range of an operating band of a serving cell of the terminal device.

The frequency band of the to-be-measured reference signal may refer to a bandwidth range using a center frequency of the to-be-measured reference signal as a center. For example, if the operating band of the serving cell of the terminal device is [10 M, 100 M] (including endpoints, which are the same below), if the frequency band of the to-be-measured reference signal is entirely included within a range of the operating band of the serving cell of the terminal device, that is, the frequency band of the to-be-measured reference signal is a subset of the operating band of the serving cell of the terminal device, for example, the frequency band of the to-be-measured reference signal is [50 M, 80 M], it is considered that the frequency band of the to-be-measured reference signal is within the range of the operating band of the serving cell of the terminal device. If there is no intersection between the frequency band of the to-be-measured reference signal and the operating band of the serving cell of the terminal device, for example, the frequency band of the to-be-measured reference signal is [120 M, 140 M] or is [2 M, 8 M], it is considered that the frequency band of the to-be-measured reference signal is not within the range of the operating band of the serving cell of the terminal device. In addition, if there is an intersection between the frequency band of the to-be-measured reference signal and the operating band of the serving cell of the terminal device, but the frequency band of the to-be-measured reference signal is not the subset of the operating band of the serving cell of the terminal device, for example, the frequency band of the to-be-measured reference signal is [80 M, 120 M] or [100 M, 120 M], it is also considered that the frequency band of the to-be-measured reference signal is not within the range of the operating band of the serving cell of the terminal device.

If the frequency band of the to-be-measured reference signal is not within the range of the operating band of the serving cell of the terminal device, the terminal device may fail to measure the to-be-measured reference signal within the operating band of the serving cell of the terminal device. Therefore, if (1) is satisfied, the one or more measurement gap parameters may be configured for the terminal device, so that the terminal device can perform, within the configured measurement gap, inter-frequency measurement departing from the operating band of the serving cell of the terminal device. The inter-frequency herein refers to a frequency different from the operating band of the serving cell of the terminal device, for example, the terminal device may measure the to-be-measured reference signal on a frequency band of the to-be-measured reference signal.

(2) The center frequency of the to-be-measured reference signal is different from a center frequency of the serving cell of the terminal device.

The center frequency is a center frequency in a frequency band. For example, the center frequency of the to-be-measured reference signal is a center frequency in a bandwidth of the to-be-measured reference signal, and the center frequency of the serving cell of the terminal device is a center frequency of an operating bandwidth of the serving cell of the terminal device. It may be understood that, that center frequencies are different may also be understood as that bandwidths corresponding to the center frequencies are different.

The terminal device usually works at the center frequency of the serving cell of the terminal device. Therefore, if the center frequency of the to-be-measured reference signal is different from the center frequency of the serving cell of the terminal device, the terminal device highly probably cannot measure the to-be-measured reference signal. In this case, the frequency band of the to-be-measured reference signal may be within the range of the operating band of the serving cell of the terminal device, or may be not within the range of the operating band of the serving cell of the terminal device. That is, even though the frequency band of the to-be-measured reference signal is within the range of the operating band of the serving cell of the terminal device, the terminal device highly probably cannot measure the to-be-measured reference signal if the center frequency of the to-be-measured reference signal is different from the center frequency of the serving cell of the terminal device. Therefore, in this case, the one or more measurement gap parameters may also be configured for the terminal device, so that the terminal device can measure the to-be-measured reference signal in the configured measurement gap.

(3) The center frequency of the to-be-measured reference signal is different from center frequencies of all synchronization signals sent by the serving cell of the terminal device, and/or the bandwidth of the to-be-measured reference signal is different from bandwidths of all the synchronization signals sent by the serving cell of the terminal device.

A cell may send a plurality of SSs, and center frequencies of different SSs may be same or different, but center frequencies of SSs sent by a same cell are all within an operating band range of the cell.

Because the terminal device measures an SS, if the center frequency of the to-be-measured reference signal is the same as a center frequency of any synchronization signal sent by the serving cell of the terminal device, the terminal device can measure the to-be-measured reference signal without a measurement gap; or if the bandwidth of the to-be-measured reference signal is the same as a bandwidth of any synchronization signal sent by the serving cell of the terminal device, the terminal device may also measure the to-be-measured reference signal without the measurement gap. However, if the center frequency of the reference signal is different from the center frequencies of all the synchronization signals sent by the serving cell of the terminal device and/or the bandwidth of the to-be-measured reference signal is different from the bandwidths of all the synchronization signals sent by the serving cell of the terminal device, the terminal device may not measure the reference signal without the measurement gap. Therefore, in this case, the measurement gap needs to be configured for the terminal device.

(4) The center frequency of the to-be-measured reference signal is different from a center frequency of an active bandwidth part of the terminal device, and/or the bandwidth of the to-be-measured reference signal is different from a bandwidth of an active bandwidth part of the terminal device.

When operating in a cell, the terminal device may be configured to use only a part of a bandwidth in the cell. In this case, the part of the bandwidth configured for the terminal for use is referred to as a bandwidth part. For example, if the bandwidth of the cell is 100 M, but the terminal device may support only 20 M of the 100 M, the terminal device is configured on a bandwidth part (BWP) of 20 M. Certainly, a plurality of bandwidth parts may be configured for one terminal device. If a plurality of bandwidth parts is configured for one terminal device, the terminal device may not be required to work on all the bandwidth parts simultaneously. A bandwidth part on which the terminal device currently works may be referred to as an active bandwidth part.

If the center frequency of the to-be-measured reference signal of the terminal device is different from the center frequency of the active bandwidth part of the terminal device, and/or the bandwidth of the to-be-measured reference signal of the terminal device is different from the bandwidth of the active bandwidth part of the terminal device, the terminal device cannot directly measure the to-be-measured reference signal, and needs to perform measurement by configuring the measurement gap.

The active bandwidth part of the terminal device includes one or more bandwidth parts.

That the center frequency of the to-be-measured reference signal of the terminal device is different from a center frequency of an active bandwidth part of the terminal device includes: that the center frequency of the to-be-measured reference signal of the terminal device is different from a center frequency of any bandwidth part in active bandwidth parts of the terminal device.

That the bandwidth of the to-be-measured reference signal of the terminal device is different from a bandwidth of an active bandwidth part of the terminal device includes: that the bandwidth of the to-be-measured reference signal of the terminal device is different from a bandwidth of any bandwidth part in active bandwidth parts of the terminal device.

(5) The center frequency of the to-be-measured reference signal is different from a center frequency of a bandwidth part configured for the terminal device, and/or the bandwidth of the to-be-measured reference signal is different from a bandwidth of the bandwidth part configured for the terminal device.

In this case, the terminal device cannot directly measure the to-be-measured reference signal, and needs to perform measurement by configuring the measurement gap.

The bandwidth part configured for the terminal device includes one or more bandwidth parts.

That the center frequency of the to-be-measured reference signal of the terminal device is different from a center frequency of a bandwidth part configured for the terminal device includes: that the center frequency of the to-be-measured reference signal of the terminal device is different from a center frequency of any bandwidth part in bandwidth parts configured for the terminal device.

That the bandwidth of the to-be-measured reference signal of the terminal device is different from a bandwidth of a bandwidth part configured for the terminal device includes: that the bandwidth of the to-be-measured reference signal of the terminal device is different from a bandwidth of any bandwidth part in bandwidth parts configured for the terminal device.

(6) The terminal device does not support simultaneous reception of two types of beams.

For example, if the terminal device reports a capability of the terminal device to the network device, the network device may receive the capability of the terminal device that is reported by the terminal device. If the capability of the terminal device indicates that the terminal device cannot receive two types of beams simultaneously, the network device may determine that the measurement gap needs to be configured for the terminal device, so that the terminal device can measure the to-be-measured reference signal in the measurement gap. The types of the beams may refer to a direction of a beam and/or a width of the beam, and beams transmitted in different directions or beams with different widths may be considered as different types of beams. Alternatively, the types of the beams may also refer to content carried by beams. If content carried by beams is different, it may be considered that types of the beams are different. For example, a beam carrying an SS and a beam carrying a CSI-RS may be considered as two different types of beams, or a beam carrying an SS and a dedicated beam carrying data may be considered as two different types of beams. It can be learned that in this embodiment of this application, whether to configure the one or more measurement gap parameters for the terminal device may be further determined based on the capability of the terminal device, so that the one or more configured measurement gap parameters better satisfy an actual requirement of the terminal device.

In the foregoing several conditions, the network device may consider that the first condition is satisfied as long as at least one of the foregoing conditions is satisfied.

S42. The network device configures the one or more measurement gap parameters for the terminal device, where the measurement gap parameter is used by the terminal device to measure a reference signal.

In S41, if the network device determines that the first condition is satisfied, the network device configures the one or more measurement gap parameters for the terminal device in S42. The network device may configure the measurement gap parameter for the terminal device based on information about the to-be-measured reference signal. For example, the network device may determine time information of the to-be-measured reference signal, so that the to-be-measured reference signal can be measured in the measurement gap indicated by the configured measurement gap parameter, or the like.

In this embodiment of this application, the network device configures a measurement gap parameter for the terminal device in several different configuration manners, which are separately described below.

A. The network device configures at least two measurement gap parameters for the terminal device.

Each measurement gap parameter indicates one measurement gap. In other words, in the manner A, the network device configures at least two measurement gaps for the terminal device.

In an example in which to-be-measured reference signals include an SS and a CSI-RS, the network device may configure two measurement gap parameters, which are respectively referred to as a first measurement gap parameter and a second measurement gap parameter, for the terminal device. The first measurement gap parameter corresponds to a first measurement gap, and the second measurement gap parameter corresponds to a second measurement gap. The first measurement gap parameter may be configured for the terminal device to measure the SS, that is, the terminal device may measure the SS by using the first measurement gap. The second measurement gap parameter may be configured for the terminal device to measure the CSI-RS, that is, the terminal device may measure the CSI-RS by using the second measurement gap. The first measurement gap and the second measurement gap may be not adjacent, or may be adjacent.

The first measurement gap parameter may include a period of a first measurement gap and an offset of a first measurement gap, and the period of a first measurement gap and the offset of a first measurement gap are used to determine time information of a first measurement gap. Both the network device and the terminal device need to determine the time information of a first measurement gap. After determining the time information of the first measurement gap, the network device may learn when the terminal device starts the first measurement gap, and the terminal device may also start the first measurement gap at a determined position. In this embodiment of this application, that the terminal device starts a measurement gap may mean that the terminal device stops sending and receiving data in the working frequency of the serving cell of the terminal device, that is, the terminal device stops work in the working frequency of the serving cell of the terminal device, and starts to measure a reference signal at another frequency. A frequency at which the terminal device measures the to-be-measured reference signal in a measurement gap may be selected by the terminal device. For example, the network device indicates in advance a plurality of frequencies beyond the operating band (or the center frequency) of the serving cell of the terminal device to the terminal device. In this case, after starting a measurement gap, the terminal device may select, in the measurement gap, to measure the to-be-measured reference signal at the at least one frequency indicated by the network device.

Certainly, the first measurement gap parameter may further include another parameter of the first measurement gap, for example, a length of the first measurement gap. This is not limited in this embodiment of this application.

The following describes a manner of determining the time information of the first measurement gap based on the period of the first measurement gap and the offset of the first measurement gap.

Figure 5:
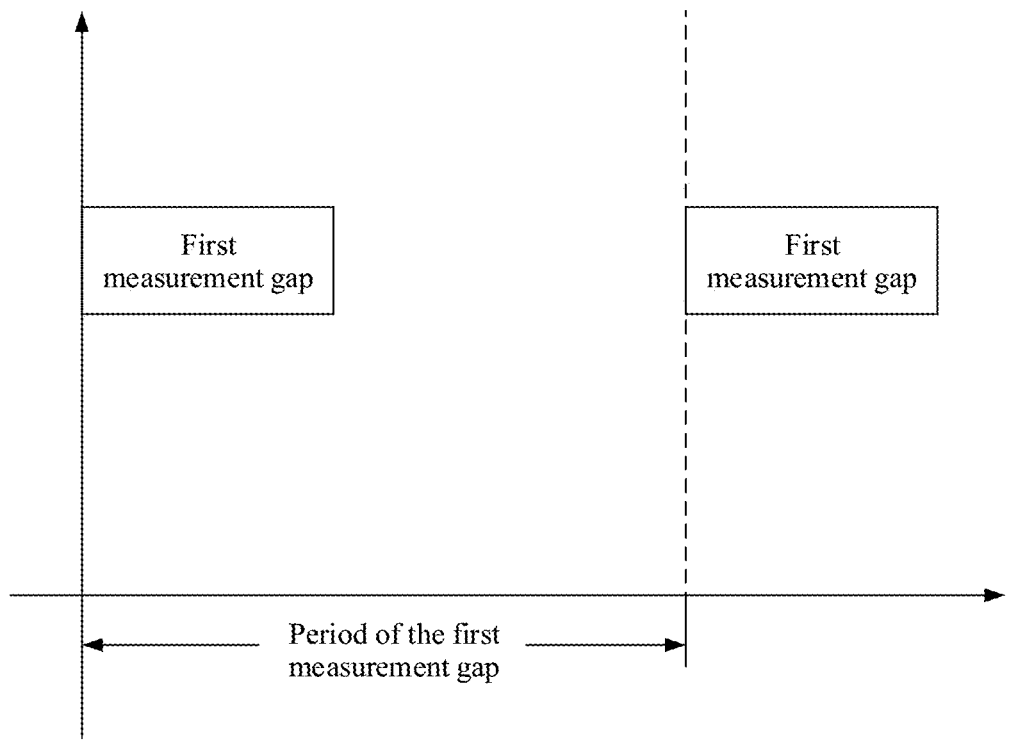
FIG. 5 is a schematic diagram of a manner of determining time information of a first measurement gap based on a period of the first measurement gap and an offset of the first measurement gap according to an embodiment of this application.

In an example, the offset of the first measurement gap is an offset of the first measurement gap relative to the period of the first measurement gap. Therefore, if the period of the first measurement gap and the offset of the first measurement gap are known, the time information of the first measurement gap is also known. For example, referring to FIG. 5, if the offset of the first measurement gap is 0, an initial position of the first measurement gap and an initial position of the period of the first measurement gap are a same position. A first measurement gap in a next period and the first measurement gap in this period are separated by only one period. If an offset of a first measurement gap is δ, there is one (period+δ) between the first measurement gap in the next period and the first measurement gap in this period.

In another example, the time information of the first measurement gap may be directly calculated according to the following formula:

$$\text{SFN mod } T = \text{FLOOR}(\text{gapOffset}/10) \quad \text{(Formula 1)}$$

That is, a position that satisfies Formula 1 may be determined as a frame in which a measurement gap occurs, and if the time information of the first measurement gap is calculated, a position that satisfies Formula 1 may be determined as a frame in which the first measurement gap occurs. In this calculation manner, a boundary of a period of a measurement gap is not explicitly defined, and a position at which the measurement gap occurs is determined directly by using a period of the measurement gap and an offset of the measurement gap.

In Formula 1, SFN represents a frame number from which the measurement gap starts, and because the time information of the first measurement gap is calculated, SFN represents a frame number from which the first measurement gap starts. T represents the period of the measurement gap, gapOffset represents the offset of the measurement gap, FLOOR( ) represents a round-down operation, and mod represents a modulo operation. A frame number from which the first measurement gap starts is calculated in Formula 1. To make a calculation result more accurate to obtain a position of a start subframe, the following formula may continue to be used:

$$\text{subframe} = \text{gapOffset mod } 10 \quad \text{(Formula 2)}$$

In Formula 2, the subframe indicates a subframe number from which the measurement gap starts, to be specific, a frame number and a subframe number from which the first measurement gap starts are calculated, so that the time information of the first measurement gap can be determined relatively accurately.

It can be learned that, as long as the period of the first measurement gap and the offset of the first measurement gap are known, the time information of the first measurement gap may be directly calculated according to Formula 1 and Formula 2.

Likewise, the second measurement gap parameter may include a period of a second measurement gap and an offset of a second measurement gap, and the period of a second measurement gap and the offset of a second measurement gap are used to determine time information of a second measurement gap. Both the network device and the terminal device also need to determine time information of a second measurement gap. After determining the time information of a second measurement gap, the network device may learn when the terminal device starts the second measurement gap, and the terminal device may also start the second measurement gap at a determined position. Certainly, the second measurement gap parameter may further include another parameter of the second measurement gap, for example, a length of the second measurement gap. This is not limited in this embodiment of this application. In addition, for a manner of determining the time information of the second measurement gap based on the period of the second measurement gap and the offset of the second measurement gap, refer to the manner of determining the time information of the first measurement gap based on the period of the first measurement gap and the offset of the first measurement gap described above. Details are not described again.

In this embodiment of this application, the first measurement gap and the second measurement gap are two different measurement gaps. Specifically, if the period of the first measurement gap is different from the period of the second measurement gap, the offset of the first measurement gap may be the same as or different from the offset of the second measurement gap. If the offset of the first measurement gap is the same as the offset of the second measurement gap, it is ensured that the first measurement gap and the second measurement gap are different measurement gaps, and the first measurement gap and the second measurement gap are relatively neatly distributed. If the offset of the first measurement gap is different from the offset of the second measurement gap, the period of the first measurement gap is different from the period of the second measurement gap, and the offset of the first measurement gap is different from the offset of the second measurement gap, so that distinguishability between the first measurement gap and the second measurement gap is relatively obvious. However, if the period of the first measurement gap is the same as the period of the second measurement gap, the offset of the first measurement gap is different from the offset of the second measurement gap. That periods are different herein may be understood as that lengths of the periods are different. To be specific, to ensure that the first measurement gap and the second measurement gap are different measurement gaps, if the period of the first measurement gap is the same as the period of the second measurement gap, the offset of the first measurement gap should be different from the offset of the second measurement gap, so that it can be ensured that the two measurement gaps are different.

For example, if the period of the first measurement gap is 10 ms, and the period of the second measurement gap is 20 ms, the offset of the first measurement gap and the offset of the second measurement gap may be same, for example, both are 2 ms, or the offset of the first measurement gap and the offset of the second measurement gap may also be different, for example, the offset of the first measurement gap is 2 ms, and the offset of the second measurement gap is 5 ms.

For another example, if the period of the first measurement gap is 20 ms, and the period of the second measurement gap is also 20 ms, the offset of the first measurement gap and the offset of the second measurement gap are different. For example, the offset of the first measurement gap is 2 ms, and the offset of the second measurement gap is 5 ms.

If the network device configures the first measurement gap to measure an SS and configures the second measurement gap to measure a CSI-RS, the network device may not send a reference signal such as the CSI-RS to the terminal device and may not send data to the terminal device in the first measurement gap. Likewise, the network device may not send data to the terminal device in the second measurement gap, but the SS is usually sent in a broadcast manner.

By configuring two measurement gap parameters for the terminal device, the terminal device can measure different reference signals in different measurement gaps. A terminal device that cannot receive two different types of beams simultaneously can measure different reference signals by using the solution provided in this embodiment of this application. In addition, a time for sending an SS by the network device may be different from a time for sending a CSI-RS by the network device. If only one measurement gap parameter is configured, a length of a measurement gap corresponding to the measurement gap parameter may be excessively long. Therefore, in this embodiment of this application, two measurement gap parameters may be configured, so that a length of a measurement gap corresponding to each measurement gap parameter is not excessively long. This does not excessively affect normal operation of the terminal device on the operating band of the serving cell of the terminal device.

B. The network device configures one measurement gap parameter for the terminal device, which is referred to as a third measurement gap parameter below.

To be specific, in the manner B, the network device still configures one measurement gap parameter for the terminal device, and the terminal device may measure a reference signal by using a measurement gap corresponding to the measurement gap parameter. For example, the third measurement gap parameter may be used to measure an SS and/or a CSI-RS.

The third measurement gap parameter may include a period of a third measurement gap and a cycle quantity of time information of a third measurement gap. The period of a third measurement gap and the cycle quantity of the time information of a third measurement gap are used to determine the time information of the third measurement gap. In addition, the third measurement gap parameter may further include another parameter of the third measurement gap, for example, a length of the third measurement gap. This is not limited in this embodiment of this application.

A reason why the cycle quantity exists is that the third measurement gap may have different positions in different periods, and if a plurality of periods are regarded as a whole, it may be considered that the third measurement gap is cycled. For example, the period of the third measurement gap is 40 ms, the length of the third measurement gap is 6 ms, and an available time in the third measurement gap except a radio frequency switching time is 5 ms. In this case, in a first period, the third measurement gap occurs at a first 5 ms in the 40 ms; in a second period, the third measurement gap occurs at a second 5 ms in the 40 ms. By analogy, in an eighth period, the third measurement gap occurs at the last 5 ms in the 40 ms; and then, from a ninth period, the third measurement gap may cycle back, to be specific, the third measurement gap occurs again at the first 5 ms in the 40 ms in the ninth period. In the example, the cycle quantity of the third measurement gap is 8.

Figure 6:
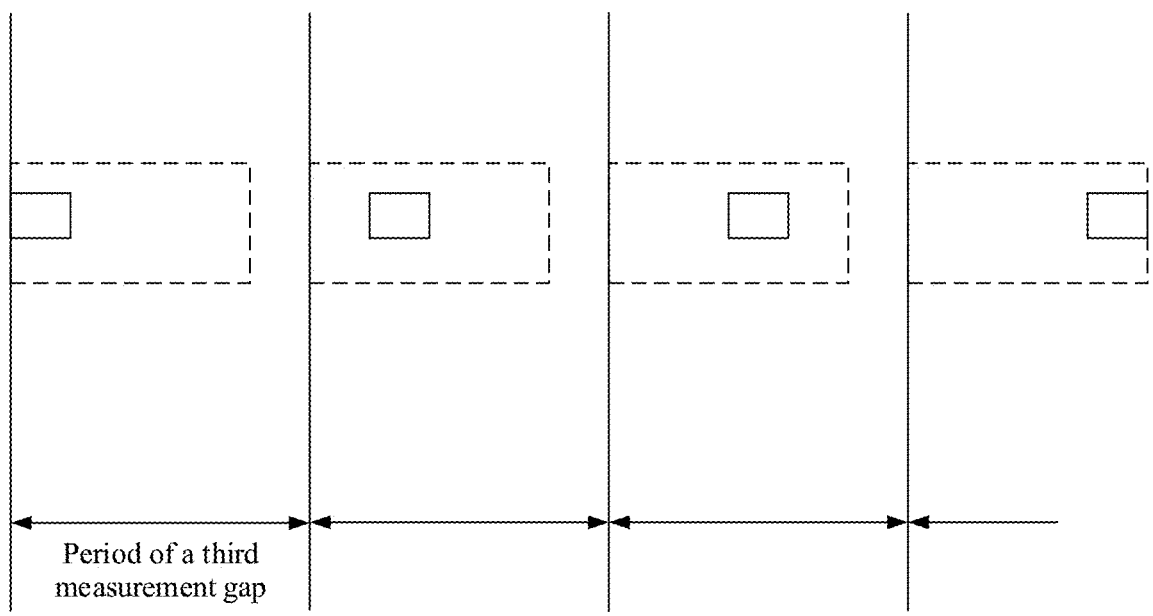
FIG. 6 is a schematic diagram of positions of a third measurement gap in different periods according to an embodiment of this application.

For more intuitive description, FIG. 6 is a schematic diagram of positions of the third measurement gap in different periods. A solid line block in FIG. 6 represents the third measurement gap. It can be learned that in the first period in FIG. 6, an initial position of the third measurement gap and an initial position of a period (that is, the first period) of the third measurement gap are a same position. In the second period, a distance between the initial position of the third measurement gap and an initial position of a period (that is, the second period) of the third measurement gap is d1. In third period, a distance between the initial position of the third measurement gap and an initial position of a period (that is, the third period) of the third measurement gap is d2, and d2>d1. In the fourth period, a distance between the initial position of the third measurement gap and an initial position of a period (that is, the fourth period) of the third measurement gap is d3, and d3>d2>d1, and so on. A cycle range of the third measurement gap may be specified. For example, a dashed-line box in FIG. 6 indicates a sliding window, and it is specified that the third measurement gap cycles within a range of the sliding window. It can be learned from FIG. 6 that, in the fourth period, the third measurement gap has already cycled to an end position of the sliding window, that is, in the fourth period, an end position of the third measurement gap and the end position of the sliding window are a same position. Therefore, in a next period, that is, in the fifth period, the initial position of the third measurement gap and an initial position of a period (that is, the fifth period) of the third measurement gap again become a same position. In the example, the cycle quantity of the third measurement gap is 5. Alternatively, a cycle range of the third measurement gap may not be additionally specified. For example, the length of the period of the third measurement gap is directly used as the cycle range of the third measurement gap. A cycle manner is similar to that in FIG. 6, and only a range of a dashed-line box becomes a length of an entire period. In this way, the third measurement gap can cover the entire period.

For the terminal device, the terminal device may need to measure reference signals sent by a plurality of cells, and positions of reference signals sent by different cells may be different. If a position of the measurement gap in each period is fixed, the terminal device measures a reference signal at a fixed position in each period, and positions of reference signals sent by some cells are always beyond the fixed measurement gap, so that the terminal device may always fail to measure the reference signals. After the technical solution provided in this embodiment of this application is used, the third measurement gap can move in different periods, so that the terminal device can measure reference signals at different positions in different periods, and the terminal device can measure, as much as possible, reference signals sent by the cells. This helps to expand a measurement range of the terminal device.

This embodiment of this application provides the following several manners to determine the time information of the third measurement gap based on the period of the third measurement gap and the cycle quantity of the time information of the third measurement gap.

In an example, the time information of the third measurement gap may be calculated by using the following formula:

Time information of a measurement gap=(time information of a period in which the measurement gap is located mod $N$)*a length of the measurement gap+an offset reference position of the measurement gap (Formula 3)

In Formula 3, the time information of the period in which the measurement gap is located may be any time in the period of the measurement gap, for example, an initial moment of the period of the measurement gap or an end moment of the period of the measurement gap. Mod indicates a modulo operation, N indicates the cycle quantity of the measurement gap, and the offset reference position of the measurement gap may be an offset of an initial position of the sliding window relative to an initial position of a period of the measurement gap shown in FIG. 6. To be specific, the time information of the third measurement gap may be directly calculated by using Formula 3.

In another example, a frame number and a subframe number from which the third measurement gap starts may be first calculated according to Formula 1 and Formula 2 that are described above, and then the offset of the third measurement gap is calculated on the basis, so that the time information of the third measurement gap may be obtained with reference to the frame number and the subframe number from which the third measurement gap starts and the offset of the third measurement gap. The offset of the third measurement gap may be calculated by using the following formula:

(An SFN/a period of a measurement gap mod $N$)*an offset step (Formula 4)

The offset step in Formula 4 may be a length of the measurement gap, or may be another predefined value, or a value configured by the network device.

The terminal device may calculate the time information of the third measurement gap in any one of the foregoing manners.

If the network device configures the third measurement gap to measure an SS, the network device may not send a reference signal such as a CSI-RS to the terminal device and may not send data to the terminal device in the third measurement gap. If the network device configures the third measurement gap to measure a CSI-RS, the network device may not send data to the terminal device in the third measurement gap, and an SS is usually sent in a broadcast manner.

By configuring one measurement gap parameter for the terminal device, the terminal device can measure a reference signal in the one measurement gap. The terminal device that cannot receive two different types of beams simultaneously can measure one of reference signals in one measurement gap and the network device may not send another reference signal to the terminal device within the measurement gap, so that a case in which the terminal device needs to receive two types of beams simultaneously can be avoided, thereby satisfying a capability requirement of the terminal device.

The foregoing describes two manners in which the network device configures the one or more measurement gap parameters for the terminal device. In actual application, any one of the foregoing manners may be selected.

S43. The network device sends the one or more configured measurement gap parameters to the terminal device, and the terminal device receives the one or more measurement gap parameters sent by the network device.

After configuring the one or more measurement gap parameters for the terminal device, the network device may send configuration information to the terminal device, so that the terminal device may receive the configuration information sent by the network device. The configuration information may include the one or more measurement gap parameters configured by the network device for the terminal device. For example, if the network device configures the first measurement gap parameter and the second measurement gap parameter for the terminal device, the configuration information may include the first measurement gap parameter and the second measurement gap parameter. If the network device configures the third measurement gap parameter for the terminal device, the configuration information may include the third measurement gap parameter. If the configuration information includes the first measurement gap parameter and the second measurement gap parameter, the network device may send the first measurement gap parameter and the second measurement gap parameter to the terminal device by using a message. In this way, transmission resources can be saved. Alternatively, the network device may also separately send the first measurement gap parameter and the second measurement gap parameter to the terminal device by using different messages. If the network device separately sends the first measurement gap parameter and the second measurement gap parameter to the terminal device by using the different messages, the network device may send the first measurement gap parameter and the second measurement gap parameter simultaneously, or the network device sends the second measurement gap parameter after sending the first measurement gap parameter, or the network device sends the first measurement gap parameter after sending the second measurement gap parameter.

After receiving the configuration information, the terminal device may start a corresponding measurement gap based on the configuration information. Descriptions are provided below. In the following description process, an example in which the network device configures the first measurement gap parameter and the second measurement gap parameter for the terminal device is used.

S44. The terminal device determines time information of the first measurement gap based on the first measurement gap parameter.

Because the first measurement gap parameter is used to measure an SS and the terminal device needs to first measure the SS to obtain time information of a cell even though the terminal device needs to measure another reference signal such as a CSI-RS. Therefore, the terminal device first determines the time information of the first measurement gap based on the first measurement gap parameter. A specific manner of determining the time information of the first measurement gap based on the period of the first measurement gap and the offset of the first measurement gap is described in S42, and the terminal device may determine the time information of the first measurement gap in the manner described above.

S45: The terminal device obtains, in the time information of the first measurement gap, time information of a cell in which the SS is located.

Specifically, the terminal device measures a synchronization signal based on the time information of the first measurement gap, to obtain time information of a cell in which the synchronization signal is located.

After determining the time information of the first measurement gap, the terminal device may start the first measurement gap at an initial position of the first measurement gap, so that the terminal device may measure the SS in the first measurement gap, to obtain, based on the SS, the time information of the cell in which the SS is located.

Figure 7:
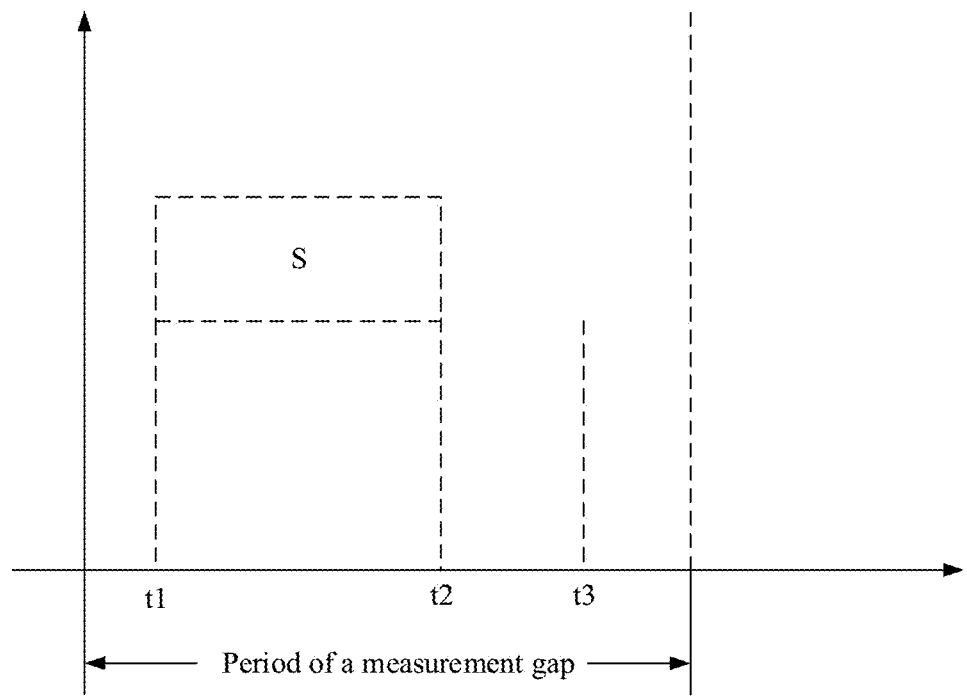
FIG. 7 is a schematic diagram of a stop moment of a first measurement gap or a start moment of a second measurement gap according to an embodiment of this application.

In addition, generally, after the terminal device measures the SS, a function of the first measurement gap is completed, and it is possibly unnecessary to continue to start the first measurement gap subsequently. In an example, the network device may configure stop time information for the first measurement gap. To be specific, the first measurement gap parameter may further include stop time information of the first measurement gap, and the stop time information of the first measurement gap may indicate a stop moment of the first measurement gap. It should be noted that the stop moment of the first measurement gap herein is not an end moment relative to the initial moment of the first measurement gap, but a moment at which the first measurement gap does not need to be started subsequently. Referring to FIG. 7, a dashed-line box S represents the first measurement gap, a position t1 represents an initial moment of the first measurement gap, a position t2 represents an end moment of the first measurement gap, the position t1 corresponds to the position t2, and a position t3 represents a stop moment of the first measurement gap. After the position t3, the first measurement gap is not started any more, and it can be learned that, in FIG. 7, the first measurement gap is not started in a next period. In FIG. 7, the position t2 and the position t3 are not a same position, but in some embodiments, the position t2 and the position t3 may alternatively be a same position. The position t3, namely, the stop moment of the first measurement gap, may be located at any position within a range of [t1, t2], or may not be located in the range of [t1, t2]. If the stop moment of the first measurement gap is located at any position in the range of [t1, t2] or the stop moment of the first measurement gap is located after t2 and before an initial moment of a next first measurement gap, the terminal device may not start the first measurement gap any more after the first measurement gap ends and when a period of the next first measurement gap arrives. If the start moment of the first measurement gap is located before t1 and is located after an end moment of a previous first measurement gap, the terminal device may not start the first measurement gap directly.

In this embodiment of this application, the stop time information of the first measurement gap may include an occurrence quantity of the first measurement gap or the stop moment of the first measurement gap. If the stop time information of the first measurement gap includes the occurrence quantity of the first measurement gap, the network device may pre-estimate a probable quantity of first measurement gaps by using which the terminal device can measure an SS. For example, if the network device pre-estimates that the terminal device can measure an SS by using two first measurement gaps, the occurrence quantity of the first measurement gap included in the stop time information of the first measurement gap may be 2, or may be 3 or a larger value for higher reliability. For example, if the occurrence quantity of the first measurement gap included in the stop time information of the first measurement gap is 2, the first measurement gap is not started any more after the first measurement gap occurs twice. If the stop time information of the first measurement gap includes the stop moment of the first measurement gap, the network device may also pre-estimate a probable time within which the terminal device can measure an SS by using the first measurement gap. For example, if the network device pre-estimates that the terminal device can measure an SS within 10 s by using the first measurement gap, the stop moment of the first measurement gap included in the stop time information of the first measurement gap may be a $10^{th}$ second, or may be an $11^{th}$ second or another larger value for higher reliability. For example, if the stop moment of the first measurement gap included in the stop time information of the first measurement gap is the $10^{th}$ second, the first measurement gap is not started any more after the first measurement gap is started for 10 s for the first time. Alternatively, the stop time information of the first measurement gap may include other types of information, as long as the information can indicate when the first measurement gap stops.

By configuring the stop time information for the first measurement gap, the first measurement gap can be ended in time, so that the terminal device can complete other work by using a time originally for the first measurement gap.

S46. The terminal device determines the time information of the second measurement gap based on the second measurement gap parameter.

The network device configures the first measurement gap parameter and the second measurement gap parameter for the terminal device. Therefore, in addition to determining the time information of the first measurement gap, the terminal device further needs to determine the time information of the second measurement gap. A specific manner of determining the time information of the second measurement gap based on the period of the second measurement gap and the offset of the second measurement gap is described in S42, and the terminal device may determine the time information of the second measurement gap in the manner described above.

S47. The terminal device measures, in the time information of the second measurement gap, a channel state information-reference signal based on time information of a cell and configuration information of the channel state information-reference signal. The configuration information of the channel state information-reference signal is used to indicate a position of the channel state information-reference signal.

The configuration information of the CSI-RS may be sent by the network device to the terminal device. For example, the configuration information of the CSI-RS may indicate a frame or a subframe in which the CSI-RS specifically occurs. In this case, after measuring the SS, the terminal device may determine a boundary of the frame or the subframe based on the obtained time information of the cell, so that a specific position of the CSI-RS may be determined.

In addition, the terminal device needs to perform measurement in the second measurement gap. In addition to learning of an initial moment of the second measurement gap, the terminal device further needs to learn of a start time of the second measurement gap, that is, the terminal device needs to determine a first start time of the second measurement gap. This embodiment of this application provides a plurality of manners of determining the start time of the second measurement gap by the terminal device. Descriptions are made separately below.

1. The start time of the second measurement gap is determined based on the stop time information of the first measurement gap.

The first measurement gap is used to measure an SS. Therefore, after the first measurement gap stops, it may be considered that the terminal device has measured the SS, in other words, the terminal device has obtained time information of a cell and may subsequently measure another reference signal such as a CSI-RS. Therefore, in the manner 1, after the first measurement gap stops, the terminal device may start the second measurement gap. The terminal device starts the second measurement gap at an initial position of a first second measurement gap after the first measurement gap stops. It may be considered that, in the manner 1, the first measurement gap and the second measurement gap do not coexist.

In the manner 1, the terminal device may determine, based on whether the first measurement gap stops, whether to start the second measurement gap. The monitoring manner is simple, and the network device does not need to additionally notify the terminal device of a start occasion of the second measurement gap.

The measurement gap periodically occurs, and a stop indicates that the measurement gap is not started any more after the stop.

2. The start time of the second measurement gap is determined based on the start time information of the second measurement gap, that is, the second measurement gap parameter further includes the start time information of the second measurement gap. The start time information of the second measurement gap may be used to indicate the first start time of the second measurement gap.

In the manner 2, the network device may pre-estimate a probable time needed by the terminal device to measure an SS, to determine the start time of the second measurement gap based on an estimated result. For example, if the network device pre-estimates that the terminal device can measure an SS within 10 s by using the first measurement gap, a start moment of the second measurement gap included in the start time information of the second measurement gap may be a $10^{th}$ second, or may be an $11^{th}$ second for higher reliability.

It should be noted that, the start moment of the second measurement gap and the initial moment of the second measurement gap are different concepts. Continuously referring to FIG. 7, if the dashed-line box in FIG. 7 represents the second measurement gap, the position t1 represents the initial moment of the second measurement gap, the position t2 represents an end moment of the second measurement gap, and the position t1 corresponds to the position t2, the start moment of the second measurement gap may be located at any position within a range of [t1, t2] or may not be located within the range of [t1, t2]. If the start moment of the second measurement gap is located at any position in the range of [t1, t2], or the start moment of the second measurement gap is located after t2 and before an initial moment of a next second measurement gap, the terminal device may start the second measurement gap for the first time after the second measurement gap ends and when the initial moment of the next second measurement gap arrives. If the start moment of the second measurement gap is located before t1 and located after an end moment of a previous second measurement gap, the terminal device may start the second measurement gap for the first time at the initial moment of the second measurement gap.

In the manner 2, the first measurement gap and the second measurement gap may not coexist, or may coexist.

In the manner 2, the network device may directly configure the start time information of the second measurement gap. The terminal device only needs to start the second measurement gap based on the start time information of the second measurement gap, and the terminal device does not need to perform determining based on other information. Therefore, the implementation is relatively simple for the terminal device.

3. The start time of the second measurement gap is determined based on time within which the second measurement gap parameter is received.

The network device sends the second measurement gap parameter to the terminal device, and in this case, the terminal device may start the second measurement gap after receiving the second measurement gap parameter. The terminal device may start the second measurement gap at an initial position of a first second measurement gap after receiving the second measurement gap parameter. In the manner 3, the terminal device may start the second measurement gap after receiving the second measurement gap parameter, and does not need to perform excessive work for determining a start occasion. This manner is relatively simple and direct. In the manner 3, the first measurement gap and the second measurement gap may not coexist, or may coexist.

According to the technical solution provided in this embodiment of this application, the terminal device can measure the to-be-measured reference signal. For example, the terminal device may send an obtained measurement report to the network device, so that the network device can perform a processing process such as determining whether to perform a cell handover. In addition, in this embodiment of this application, when the third measurement gap can slide, the terminal device can measure more reference signals sent by cells and can obtain a more detailed measurement report. This helps to make a processing result of the network device more accurate.

Apparatuses according to the embodiments of this application are described below with reference to the accompanying drawings.

Figure 8:
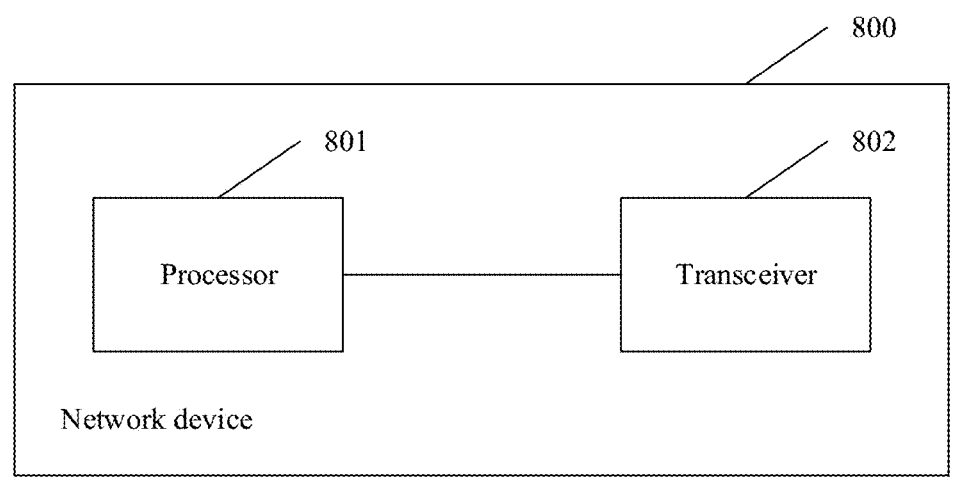
FIG. 8 is a schematic structural diagram of a network device according to an embodiment of this application.

FIG. 8 is a schematic structural diagram of a network device 800. The network device 800 may implement functions of the network device in the foregoing descriptions. The network device 800 may include a processor 801. Optionally, the network device 800 may further include a transceiver 802. The processor 801 may be configured to perform S41 and S42 in the embodiment shown in FIG. 4, and/or support another process of the technology described in this specification. The transceiver 802 may be configured to perform S43 in the embodiment shown in FIG. 4, and/or support another process of the technology described in this specification.

For example, the processor 801 is configured to: when it determined that a first condition is satisfied, configure a measurement gap parameter for a terminal device, where the measurement gap parameter is used by the terminal device to measure a to-be-measured reference signal. The first condition includes at least one of the following: a frequency band of the to-be-measured reference signal is not within a range of an operating band of a serving cell of the terminal device; a center frequency of the to-be-measured reference signal is different from a center frequency of the serving cell of the terminal device; the center frequency of the to-be-measured reference signal is different from center frequencies of all synchronization signals sent by the serving cell of the terminal device; a bandwidth of the to-be-measured reference signal is different from bandwidths of all the synchronization signals sent by the serving cell of the terminal device; the center frequency of the to-be-measured reference signal is different from a center frequency of an active bandwidth part of the terminal device; the bandwidth of the to-be-measured reference signal is different from a bandwidth of the active bandwidth part of the terminal device; the center frequency of the to-be-measured reference signal is different from a center frequency of a bandwidth part configured for the terminal device; the bandwidth of the to-be-measured reference signal is different from a bandwidth of the bandwidth part configured for the terminal device; and the terminal device does not support simultaneous reception of two types of beams.

All related content of the steps in the foregoing method embodiments may be cited in function descriptions of corresponding function modules, and details are not described herein again.

Figure 9A:
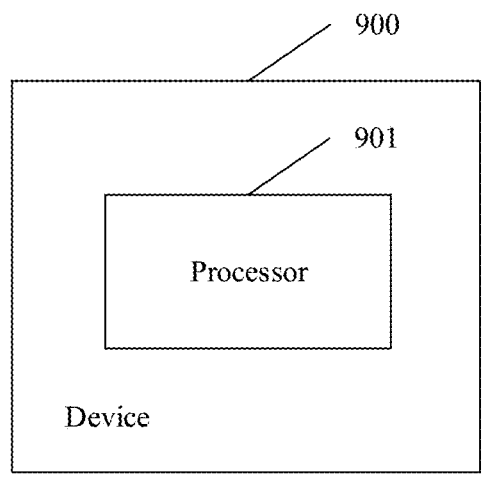
FIG. 9A is a schematic structural diagram of a device according to an embodiment of this application.

FIG. 9A is a schematic structural diagram of a device 900. The device 900 may implement functions of the terminal device in the foregoing descriptions. The device 900 may include a processor 901. The processor 901 may be configured to perform S43 to S47 in the embodiment shown in FIG. 4, and/or support another process of the technology described in this specification.

For example, the processor 901 is configured to: determine time information of a first measurement gap based on a first measurement gap parameter; obtain, in the time information of the first measurement gap, time information of a cell in which a channel state information-reference signal is located; determine time information of a second measurement gap based on a second measurement gap parameter; and measure, in the time information of the second measurement gap, the channel state information-reference signal based on the time information of the cell and configuration information of the channel state information-reference signal, where the configuration information of the channel state information-reference signal is used to indicate a position of the channel state information-reference signal.

All related content of the steps in the foregoing method embodiments may be cited in function descriptions of corresponding function modules, and details are not described herein again.

The device 900 may be a field-programmable gate array (FPGA), an application-specific integrated circuit (ASIC), a system on chip (SoC), or a central processor unit (CPU), a network processor (NP), a digital signal processor (DSP), a micro controller unit (MCU), or may be a programmable logic device (PLD) or another integrated chip. The device 900 may be disposed in the network device or the terminal device in the embodiments of this application, so that the network device or the terminal device implements the measurement gap parameter configuration method and the reference signal measurement method according to the embodiments of this application.

Figure 9B:
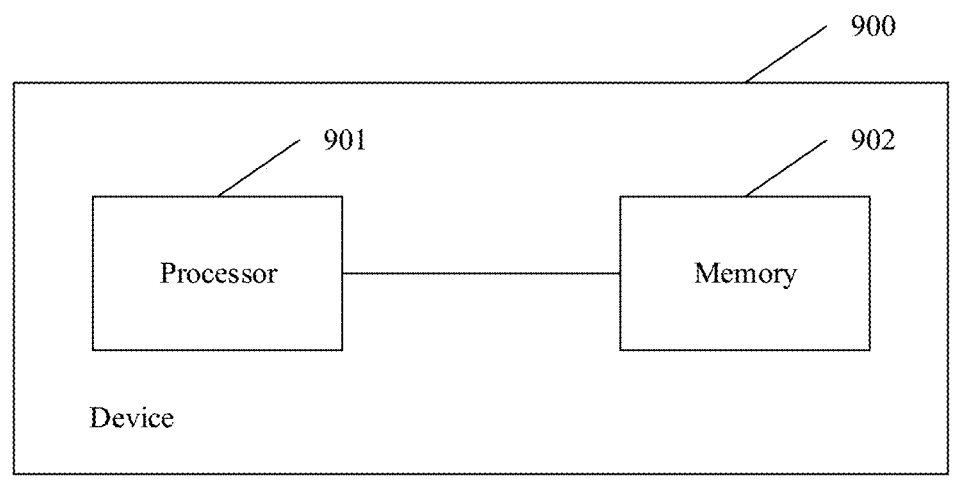
FIG. 9B is a schematic structural diagram of a device according to an embodiment of this application.

In an optional implementation, the device 900 may further include a memory 902. Referring to FIG. 9B, the memory 902 is configured to store computer programs or instructions, and the processor 901 is configured to decode and execute the computer programs or the instructions. It should be understood that, the computer programs or the instructions may include functional programs of the foregoing terminal device. When the functional program of the terminal device is decoded and executed by the processor 901, the terminal device can implement functions of the terminal device in the reference signal measurement method in the embodiments of this application.

In another optional implementation, the functional programs of the terminal device are stored in a memory outside the device 900. When the functional programs of the terminal device are decoded and executed by the processor 901, the memory 902 temporarily stores some or all content of the functional programs of the terminal device.

In another optional implementation, the functional programs of the terminal device are stored in a memory 902 inside the device 900. When the memory 902 inside the device 900 stores the functional programs of the terminal device, the device 900 may be disposed in the terminal device according to the embodiments of this application.

In still another optional implementation, some content of the functional programs of the terminal device is stored in the memory outside the device 900, and other content of the functional programs of the terminal device is stored in the memory 902 inside the device 900.

In the embodiments of this application, the network device 800 and the device 900 are presented by dividing functional modules based on corresponding functions, or may be presented by dividing functional modules in an integrated manner. The "module" herein may refer to an ASIC, a processor and a memory that execute one or more software or firmware programs, an integrated logic circuit, and/or another component that can provide the foregoing functions.

In addition, alternatively, the network device in the embodiment shown in FIG. 8 may be implemented in another form. For example, the network device includes a processing module. The processing module may be configured to perform S41 and S42 in the embodiment shown in FIG. 4, and/or support another process of the technology described in this specification. Optionally, the network device may further include a transceiver module. The transceiver module is connected to the processing module, and may be configured to perform S43 in the embodiment shown in FIG. 4 and/or support another process of the technology described in this specification. All related content of the steps in the foregoing method embodiments may be cited in function descriptions of corresponding function modules, and details are not described herein again.

In addition, alternatively, the terminal device provided in the embodiment shown in FIG. 9A or FIG. 9B may be implemented in another form. For example, the terminal device includes a processing module. The processing module may be configured to perform S43 to S47 in the embodiment shown in FIG. 4, and/or support another process of the technology described in this specification.

All related content of the steps in the foregoing method embodiments may be cited in function descriptions of corresponding function modules, and details are not described herein again.

The network device 800 and the device 900 provided in the embodiments of this application may be configured to perform the method provided in the embodiment shown in FIG. 4. Therefore, for technical effects that can be obtained by the network device 800 and the device 900, refer to the foregoing method embodiments. Details are not described herein again.

An embodiment of this application further provides a communications apparatus, and the communications apparatus may be a terminal device or a circuit. The communications apparatus may be configured to perform an action performed by the terminal device in the foregoing method embodiments.

Figure 10:
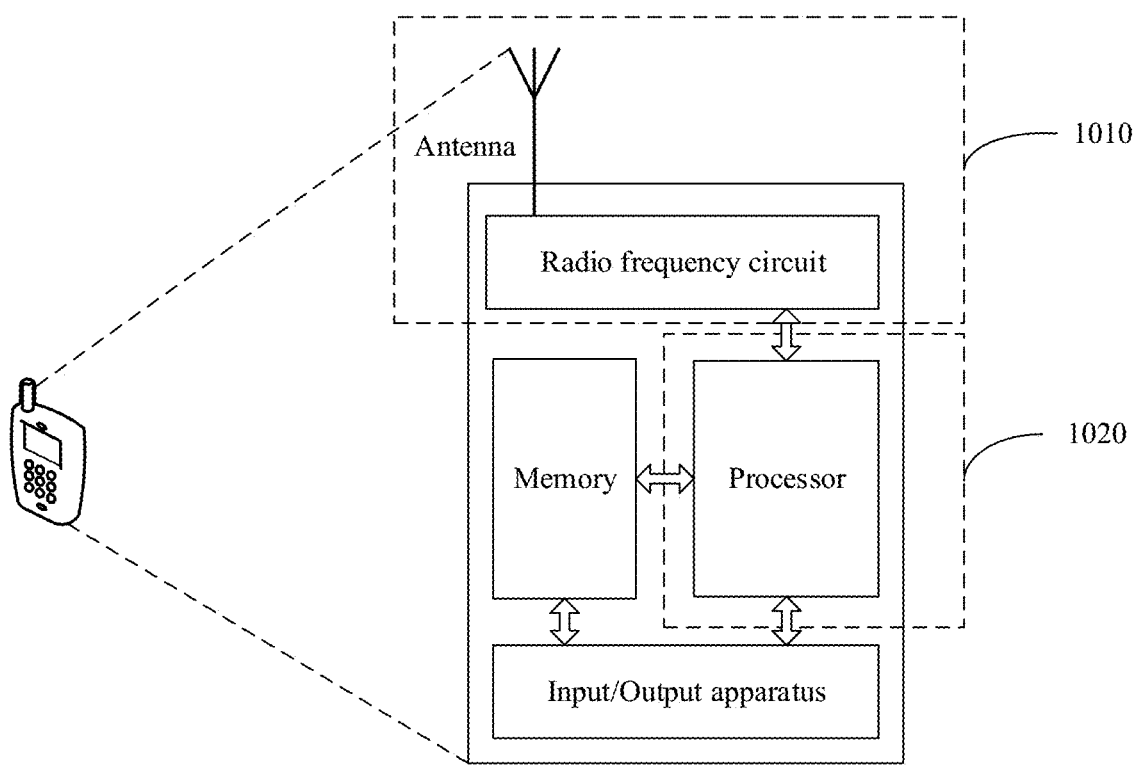
FIG. 10 is a schematic block diagram of a communications apparatus according to an embodiment of this application.

When the communication apparatus is a terminal device, FIG. 10 is a simplified schematic structural diagram of the terminal device. For ease of understanding and convenience of figure illustration, an example in which the terminal device is a mobile phone is used in FIG. 10. As shown in FIG. 10, the terminal device includes a processor, a memory, a radio frequency circuit, an antenna, and an input/output apparatus. The processor is mainly configured to process a communication protocol and communication data, control the terminal device, execute a software program, process data of a software program, or the like. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in an electromagnetic wave form. The input/output apparatus such as a touchscreen, a display screen, or a keyboard, is mainly configured to receive data input by a user and output data to the user. It should be noted that some types of terminal devices may not have the input/output apparatus.

When the processor needs to send data, the processor performs baseband processing on the to-be-sent data, and then outputs a baseband signal to the radio frequency circuit. After performing radio frequency processing on the baseband signal, the radio frequency circuit sends the radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiving function may be considered as a transceiver unit of the terminal device, and the processor that has a processing function may be considered as a processing unit of the terminal device. As shown in FIG. 10, the terminal device includes a transceiver unit 1010 and a processing unit 1020. The transceiver unit may also be referred to as a transceiver, a transceiver apparatus, or the like. The processing unit may also be referred to as a processor, a processing board, a processing module, a processing apparatus, or the like. Optionally, a component for implementing a receiving function in the transceiver unit 1010 may be considered as a receiving unit, and a component for implementing a sending function in the transceiver unit 1010 may be considered as a sending unit. In other words, the transceiver unit 1010 includes the receiving unit and the sending unit. The transceiver unit sometimes may also be referred to as a transceiver, a transceiver circuit, or the like. The receiving unit sometimes may also be referred to as a receiver, a receiving circuit, or the like. The sending unit sometimes may also be referred to as a transmitter, a transmitter circuit, or the like.

It should be understood that the transceiver unit 1010 is configured to perform a sending operation and a receiving operation on a terminal device side in the foregoing method embodiments, and the processing unit 1020 is configured to perform another operation excluding the receiving operation and the sending operation of the terminal device in the foregoing method embodiments.

For example, in an implementation, the transceiver unit 1010 is configured to perform a receiving operation on the terminal device side in S43 in FIG. 4, and/or the transceiver unit 1010 is further configured to perform another receiving and sending step on the terminal device side in the embodiments of this application. The processing unit 1020 is configured to perform S44 to S47 in FIG. 4, and/or the processing unit 1020 is further configured to perform another processing step on the terminal device side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 11:
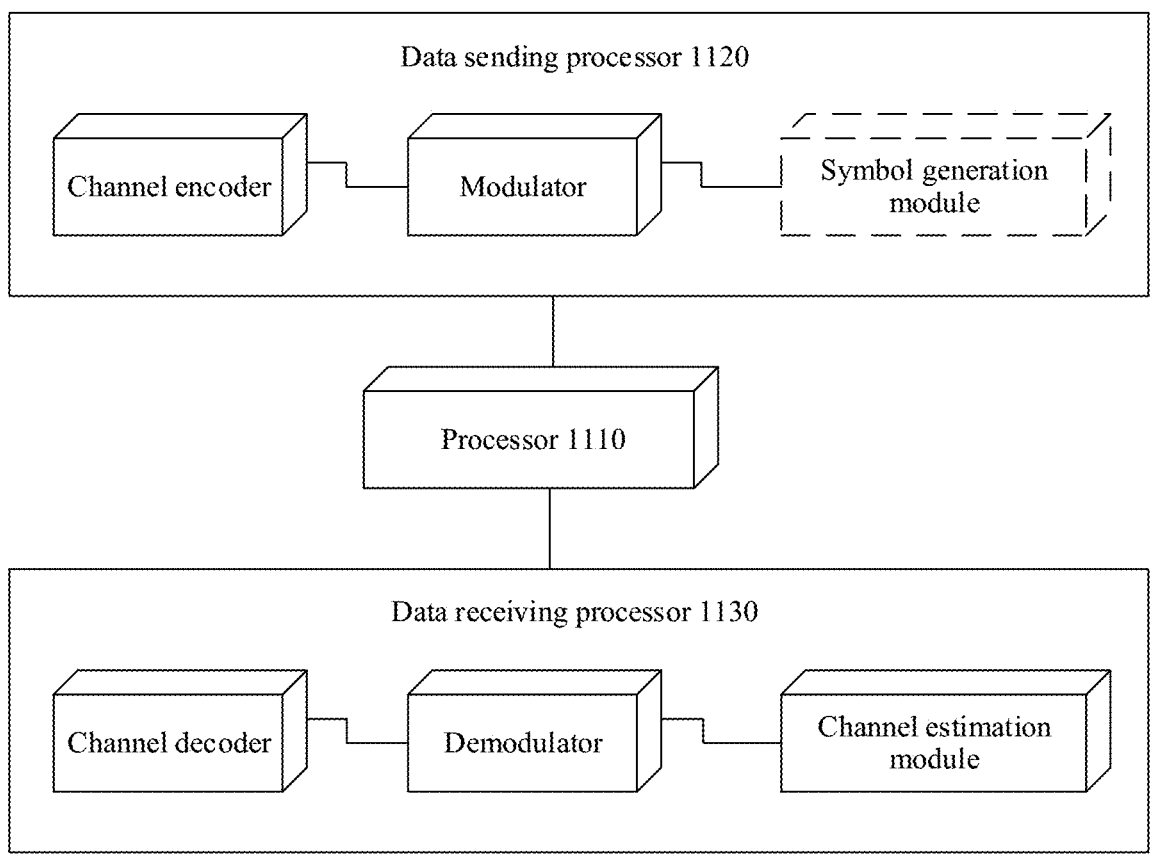
FIG. 11 is another schematic block diagram of a communications apparatus according to an embodiment of this application.

When the communications apparatus in this embodiment is a terminal device, refer to a device shown in FIG. 11. In an example, the device may implement a function similar to that of the processor 901 in FIG. 9. In FIG. 11, the device includes a processor 1110, a data sending processor 1120, and a data receiving processor 1130. The processor 901 in the foregoing embodiment may be the processor 1110 in FIG. 11, and implements a corresponding function. The data sending processor 1120 and/or the data receiving processor 1130 in FIG. 11 may implement a data receiving and sending function. Although FIG. 11 shows a channel encoder and a channel decoder, it may be understood that the modules are merely examples, and do not constitute a limitation on this embodiment.

Figure 12:
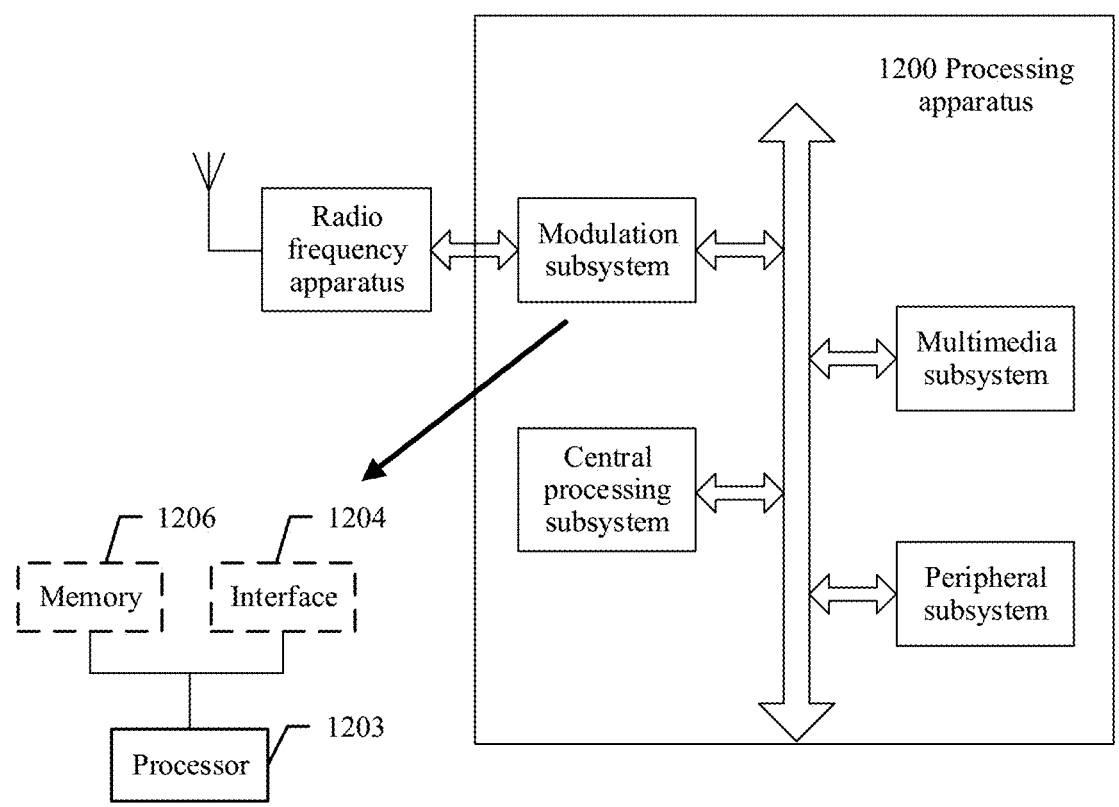
FIG. 12 is still another schematic block diagram of a communications apparatus according to an embodiment of this application.

FIG. 12 shows another form of this embodiment. A processing apparatus 1200 includes modules such as a modulation subsystem, a central processing subsystem, and a peripheral subsystem. A communications apparatus in this embodiment may be used as the modulation subsystem in the processing apparatus 1200. Specifically, the modulation subsystem may include a processor 1203 and an interface 1204. The processor 1203 implements a function of the processor 901. In another variation, the modulation subsystem includes a memory 1206, a processor 1203, and a program that is stored in the memory 1206 and that can run on the processor. When executing the program, the processor 1203 implements the method on a terminal device side in the foregoing method embodiments. It should be noted that the memory 1206 may be non-volatile or volatile. The memory 1206 may be located in the modulation subsystem, or may be located in the processing apparatus 1200, as long as the memory 1206 can be connected to the processor 1203.

In another form of this embodiment, a computer-readable storage medium is provided. The computer-readable storage medium stores an instruction. When the instruction is executed, the method on a terminal device side in the foregoing method embodiments is performed.

In another form of this embodiment, a computer program product that includes an instruction is provided. When the instruction is executed, the method on a terminal device side in the foregoing method embodiments is performed.

The embodiments of this application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Obviously, a person skilled in the art can make various modifications and variations to embodiments of this application without departing from the spirit and scope of this application. This application is intended to cover these modifications and variations provided that they fall within the scope of the following claims of this application and their equivalent technologies.

What is claimed is:

1. A method, comprising:
configuring, by a network device, a first measurement gap parameter and a second measurement gap parameter for a terminal device, wherein the first measurement gap parameter is usable by the terminal device to measure a synchronization signal, and wherein the second measurement gap parameter is usable by the terminal device to measure a channel state information-reference signal;
wherein the first measurement gap parameter comprises a period of the first measurement gap and an offset of the first measurement gap, wherein the second measurement gap parameter comprises a period of the second measurement gap and an offset of the second measurement gap; and
wherein the period of the first measurement gap is the same as the period of the second measurement gap, and the offset of the first measurement gap is different from the offset of the second measurement gap.

2. The method according to claim 1, wherein after configuring, by the network device, the measurement gap parameters for a terminal device, the method further comprises:
sending, by the network device, the measurement gap parameters to the terminal device.

3. A network device, comprising:
a processor, configured to:
configure a first measurement gap parameter and a second measurement gap parameter for a terminal device, and wherein the first measurement gap parameter is usable by the terminal device to measure a synchronization signal, and the second measurement gap parameter is usable by the terminal device to measure a channel state information-reference signal;
wherein the first measurement gap parameter comprises a period of the first measurement gap and an offset of the first measurement gap, wherein the second measurement gap parameter comprises a period of the second measurement gap and an offset of the second measurement gap; and
wherein the period of the first measurement gap is the same as the period of the second measurement gap, and the offset of the first measurement gap is different from the offset of the second measurement gap.

4. The network device according to claim 3, wherein the network device further comprises a transceiver, configured to:
send the measurement gap parameters to the terminal device after the processor configures the measurement gap parameters for the terminal device.

5. A method, comprising:
receiving, by a terminal device, a first measurement gap parameter and a second measurement gap parameter, wherein the first measurement gap parameter is usable by the terminal device to measure a synchronization signal, and the second measurement gap parameter is usable by the terminal device to measure a channel state information-reference signal;
measuring, by the terminal device, a synchronization signal according to the first measurement gap parameter; and
measuring, by the terminal device, a channel state information-reference signal according to the second measurement gap parameter;
wherein a period of the first measurement gap is the same as a period of the second measurement gap, and an offset of the first measurement gap is different from an offset of the second measurement gap.

6. The method according to claim 5, wherein the first measurement gap parameter further comprises stop time information of the first measurement gap, and the method further comprises:
determining, by the terminal device, a stop moment of the first measurement gap based on the stop time information of the first measurement gap.

7. The method according to claim 6, wherein the stop time information of the first measurement gap comprises an occurrence quantity of the first measurement gap or the stop moment of the first measurement gap.

8. The method according to claim 6, further comprising:
starting, by the terminal device, the second measurement gap after the first measurement gap stops.

9. The method according to claim 5, wherein the second measurement gap parameter further comprises start time information of the second measurement gap, and the method further comprises:
determining, by the terminal device, a start moment of the second measurement gap based on the start time information of the second measurement gap.

10. The method according to claim 5, further comprising:
receiving, by the terminal device, the second measurement gap parameter sent by a network device; and
starting, by the terminal device, the second measurement gap.

11. A terminal device, comprising:
a processor, configured to:
receive a first measurement gap parameter and a second measurements gap parameter, wherein the first measurement gap parameter is usable by the terminal device to measure a synchronization signal, and the second measurement gap parameter is usable by the terminal device to measure a channel state information-reference signal;
measure a synchronization signal according to the first measurement gap parameter; and
measure a channel state information-reference signal according to the second measurement gap parameter;
wherein a period of the first measurement gap is the same as a period of the second measurement gap, and an offset of the first measurement gap is different from an offset of the second measurement gap.

12. The terminal device according to claim 11, wherein the first measurement gap parameter further comprises stop time information of the first measurement gap; and
wherein the processor is further configured to:
determine a stop moment of the first measurement gap based on the stop time information of the first measurement gap.

13. The terminal device according to claim 12, wherein the stop time information of the first measurement gap comprises an occurrence quantity of the first measurement gap or the stop moment of the first measurement gap.

14. The terminal device according to claim 12, wherein the processor is further configured to:
start the second measurement gap after the first measurement gap stops.

15. The terminal device according to claim 11, wherein the second measurement gap parameter further comprises start time information of the second measurement gap; and
wherein the processor is further configured to:
determine a start moment of the second measurement gap based on the start time information of the second measurement gap.

16. The terminal device according to claim 11, wherein the processor is further configured to:
receive the second measurement gap parameter sent by a network device; and
start the second measurement gap.

* * * * *